United States Patent [19]
Fujinami et al.

[11] Patent Number: 5,455,684
[45] Date of Patent: Oct. 3, 1995

[54] APPARATUS AND METHOD FOR PROCESSING A VARIABLE-RATE CODED SIGNAL FOR RECORDING TO PROVIDE A HIGH-SPEED SEARCH CAPABILITY, APPARATUS AND METHOD FOR REPRODUCING SUCH PROCESSED SIGNAL, AND RECORDING INCLUDING SUCH PROCESSED SIGNAL

[75] Inventors: Yasushi Fujinami, Kanagawa; Markus H. Veltman, Tokyo, both of Japan

[73] Assignee: Sony Corporation, Japan

[21] Appl. No.: 125,573

[22] Filed: Sep. 22, 1993

[30] Foreign Application Priority Data

Sep. 22, 1992 [JP] Japan .................................. 4-277956
Dec. 4, 1992 [JP] Japan .................................. 4-350577

[51] Int. Cl.⁶ .................................. H04N 5/76
[52] U.S. Cl. .................. 358/335; 358/342; 360/32; 360/33.1; 348/390
[58] Field of Search .................. 358/335, 342; 360/33.1, 32; 348/390; H04N 5/76

[56] References Cited

U.S. PATENT DOCUMENTS 5,057,949 10/1991 Suga et al. .................. 360/10.2
5,126,852 6/1992 Nishino et al. .................. 358/335
5,140,437 8/1992 Yonemitsu et al. .................. 358/335

*Primary Examiner*—Tommy P. Chin
*Assistant Examiner*—Khoi Truong
*Attorney, Agent, or Firm*—Limbach & Limbach; Ian Hardcastle

[57] ABSTRACT

An apparatus and method for preparing a variable-rate coded signal, generated by compressing a digital input signal using a variable compression ratio and including a signal portion of a predetermined type, for recording on a recording medium. In the apparatus, a circuit generates a flag signal indicating the signal portion of the a predetermined type in the variable-rate coded signal. A signal-type marker generating circuit generates a signal-type marker in response to the flag signal. Finally, a circuit multiplexes the signal-type marker with the variable-rate coded signal to produce a multiplexed signal for recording on the recording medium. The signal-type marker is located adjacent to the signal portion of the predetermined type to indicate the signal portion of the predetermined type in the multiplexed signal. Where the multiplexed signal is divided into packs of plural packets, the signal marker is included in an entry pack located immediately preceding a packet that includes the signal portion of the predetermined type. Where the multiplexed signal is divided into sectors and each sector includes a sector header, the signal marker is included as subcode in the sector header of a sector that includes the signal portion of a predetermined type.

63 Claims, 19 Drawing Sheets

FIG. 4
PRIOR ART

STREAM_ID TABLE

| STREAM ID | STREAM TYPE |
|---|---|
| 1011 1100 | RESERVED STREAM |
| 1011 1101 | PRIVATE_STREAM_1 |
| 1011 1110 | PADDING STREAM |
| 1011 1111 | PRIVATE_STREAM_2 |
| 110x xxxx | AUDIO STREAM-NUMBER xxxx |
| 1110 xxxx | VIDEO STREAM-NUMBER xxxx |
| 1111 xxxx | RESERVED DATA STREAM-NUMBER xxxx |

FIG. 9
PRIOR ART

| ENTRY | |
|---|---|
| #0 | SECTOR ADDRESS OF ENTRY POINT #0 |
| #1 | SECTOR ADDRESS OF ENTRY POINT #1 |
| #2 | SECTOR ADDRESS OF ENTRY POINT #2 |
| #3 | SECTOR ADDRESS OF ENTRY POINT #3 |
| ------ | |
| #N-1 | SECTOR ADDRESS OF ENTRY POINT #N-2 |
| | SECTOR ADDRESS OF ENTRY POINT #N-1 |

FIG. 14

| PACKET START CODE PREFIX | ID | LENGTH | **** ID | **** PACKET TYPE | CURRENT # DATA STREAMS | CURRENT # VIDEO STREAMS | CURRENT # AUDIO STREAMS | -3 | -2 | -1 | +1 | +2 | +3 |
|---|---|---|---|---|---|---|---|---|---|---|---|---|---|

APPARATUS AND METHOD FOR PROCESSING A VARIABLE-RATE CODED SIGNAL FOR RECORDING TO PROVIDE A HIGH-SPEED SEARCH CAPABILITY, APPARATUS AND METHOD FOR REPRODUCING SUCH PROCESSED SIGNAL, AND RECORDING INCLUDING SUCH PROCESSED SIGNAL

FIELD OF THE INVENTION

This invention relates to an apparatus and method for processing a variable-rate coded signal prior to recording so that high-speed searching can be carried out on a recording medium on which the processed signal is recorded. The invention also relates to an apparatus and method for performing a high-speed search on a medium on which a processed variable-rate coded signal is recorded. Finally, the invention relates to a recording of the processed variable-rate coded signal.

BACKGROUND OF THE INVENTION

Examples of a conventional recording apparatus and a conventional reproducing apparatus are shown in FIGS. 1 and 2. Referring to FIG. 1, the digital video signal to be recorded is compressed and coded by the video encoder 1, and then fed into the video signal buffer 4 in the multiplexing circuit 3. The digital audio signal to be recorded is compressed and coded by the audio encoder 2, and then fed into to the audio signal buffer 5 in the multiplexing circuit 3.

The output terminals of the signal buffers 4 and 5 are connected to the input terminals E1 and E2 of the switching circuit 6, respectively. The output terminal F of the switching circuit 6 is connected to the input terminal of the header addition circuit 7. The output of the header addition circuit 7 is supplied to the digital storage medium (DSM) 10, which includes, for example, a magneto-optical disk or a magnetic disk, e.g., a hard disk. The control circuit 8 receives system clock signals from the multiplexing system clock generation circuit 9, and causes the switching circuit 6 to connect the output terminal F to the input terminals E1 and E2 successively at a predetermined time interval. This successively fetches video signal bytes from the video signal buffer 4 and audio signal bytes from the audio signal buffer 5, thereby time division multiplexing the audio and video signals.

The control circuit 8 causes the switching circuit 6 and the header addition circuit 7 to produce a multiplexed signal having the multiplexing system format set forth in the ISO 11172 (MPEG) standard. The multiplexed signal includes one or more packs (PACK) and one ISO_11172_end_code, as shown in FIG. 3. The ISO_11172_end_code is a code of 32 bits and is, when represented in the hexadecimal notation, 0x000001B9. The prefix 0x indicates hexadecimal notation, where x is indeterminate.

Each pack includes a header, which includes a Pack_Start_Code, a System Clock Reference (SCR), a MUX_Rate, and one or more packets (Packet). The Pack_Start_Code of the header is a code of 32 bits and is 0x 000001B4, the prefix 0x once again indicating hexadecimal notation. A pack has a variable length up to a maximum of 2,048 bytes.

Each packet includes a header, which includes a Packet_Start_Code_Prefix, a stream_ID, a Packet_length, a Presentation Time Stamp (PTS), a Decoding Time Stamp (DTS), and a packet data portion. The Packet_Start_Code_Prefix is a code of 24 bits and is 0x000001. The Stream_ID is a code of 8 bits and indicates the type of the packet, as shown in FIG. 4. The Packet_length (16 bits) indicates the length of the packet following it.

The packet data portion of each packet consists of a portion of the digital audio signal (when the stream type indicates an audio stream) or a portion of the video signal (when the stream type indicates a video stream). Further, since each audio stream can have one of 32 different stream_IDs and the each video stream can have one of up to 16 different stream_IDs, up to 32 different audio signals and up to 16 different video signals can be multiplexed.

A reserved stream includes, for example, subtitle data. Private_stream_1 and private_stream_2 do not have defined applications. A padding_stream is used to increase the amount of data.

The control circuit 8 (FIG. 1) controls adding headers and reading signal bytes using an algorithm such as that shown, for example, in FIG. 5 so that a total of 2,048 bytes are included in each pack in accordance with the format described above.

Referring to FIGS. 1 and 5, at step S1, the control circuit 8 instructs the header addition circuit 7 to generate a pack header. Then, at step S2, the control circuit 8 waits until the sum of M4 and M5 is equal to or greater than the number of signal bytes D included in one pack. In other words, the control circuit 8 waits until the total number of signal bytes accumulated in the signal buffers 4 and 5 is equal to the number of bytes that can be accommodated by one pack, M4 represents the number of bytes of video signal written in the video signal buffer 4, and M5 represents the number of bytes of audio signal written in the audio signal buffer 5. D represents a total number of signal bytes that can be accommodated in one pack. To simplify the description, it will be assumed that D is a constant obtained by subtracting the number of bytes in the pack headers, the number of bytes in the video packet headers, and the number of bytes in the audio packet headers, from the number of bytes (2,048) in a pack.

In step S3, the number of bytes P1 of video signal that will be accommodated in the pack and the number of bytes P2 of audio signal that will be accommodated in the pack are calculated using the following equations:

$$P1=D\times M4/(M4+M5)$$

$$P2=D-P1$$

Thus, P and P2 are calculated by distributing the total number of signal bytes D accommodated by the pack according to the ratio of numbers of bytes M4 and M5 accumulated in the signal buffers 4 and 5.

At step S4, after the numbers of signal bytes are determined, the control circuit 8 instructs the header addition circuit 7 to generate a video packet header, and to feed the video packet header to the DSM 10. Then, at step S5, the control circuit 8 transfers P1 bytes of video signal from the video signal buffer 4 to the DSM 10. At step S6, the control circuit 8 causes the header addition circuit to generate an audio packet header, and to feed it to the DSM 10. At step S7, the control circuit 8 transfers P2 bytes of audio signal from the signal buffer 5 to the DSM 10. The DSM 10 records the multiplexed signal received from the multiplexing circuit 3. At step S8, the control circuit tests whether all the video signal and all of the audio signal have been multiplexed. If the result is NO, execution returns to step S1. If the result is YES, execution proceeds to step S9, at which step the program ends.

The multiplexed signal recorded on the DSM 10 in this manner is reproduced and decoded by the reproducing apparatus shown in FIG. 2. In FIG. 2, the header separation circuit 22 in the separation circuit 21 separates pack headers and packet headers from the multiplexed signal read out from the DSM 10. The header separation circuit 22 supplies the headers to the control circuit 24, and supplies the multiplexed signal to the input terminal G of the switching circuit 23. The output terminals H1 and H2 of the switching circuit 23 are connected to the input terminals of the video decoder 25 and the audio decoder 26, respectively. The control circuit 24 in the separation circuit 21 successively connects the input terminal G of the switching circuit 23 to the output terminals H1 and H2 in accordance with the stream_ID of the packet header received from the header separation circuit 22. In this way, the audio signal and the video signal are demultiplexed from the time-division multiplexed signal, and are supplied to the corresponding decoder.

When the video signal fed into the multiplexing circuit 3 is compressed in accordance with the MPEG coding standard, this imposes limitations on performing random access or searching operations. A video signal that is compressed according to the MPEG standard includes intra-picture coded pictures, I (intra) pictures, and two types of inter-picture coded pictures: P (forward predictive) pictures and B (bidirectional predictive) pictures. Of the three types of pictures, only I-pictures are compressed independently of other pictures, and can therefore be said to be intrinsically expandable. To decode the video signal of an I-picture requires only the video signal of the I-picture itself, and does not require the video signals of other pictures. However, because of this, the coding efficiency of I-pictures is low. Since P-pictures and B-pictures are obtained by decoding difference signals from preceding and/or following reference pictures, the compression efficiency of such pictures is high. However, decoding a P-picture or a B-picture requires that the video signal of a reference picture preceding or following the picture be decoded in addition to the video signal of the picture. Consequently, during a search, only about two I-pictures are normally reproduced each second. This provides a random access facility while retaining an acceptable average compression efficiency.

FIG. 6 shows a diagram of a digital video signal including I-pictures, P-pictures, and B-pictures as it is recorded on the DSM 10. The digital video signal is divided into more than one Groups of Pictures (GOPs). Each GOP begins with an I-picture. When the video signal is compressed at a fixed rate, since an I-picture periodically appears at a predetermined location, the location can be determined by calculation and the I-picture accessed. However, when the video signal is compressed at a variable rate, the location of the I-pictures is indeterminate, and it is thus difficult to access the I-pictures.

When a search command is received by the reproducing apparatus shown in FIG. 2, a main control apparatus (not shown) delivers to the control circuit 24, the video decoder 25, and the audio decoder 26, an instruction to transition to search mode. In search mode, the video decoder 5 decodes only the I-pictures in the video signal received from the switching circuit 23. Alternatively, only video signals representing I-pictures are selected by the separation circuit 21 and fed into the video decoder 25. The video decoder 25 then decodes the video signals that it receives.

In search mode, the control circuit 24 commands the DSM 10 to move the read position on the disk forwards or backwards. The amount of movement of the read position depends upon the search rate, the compression ratio, etc.; generally, the amount of movement increases as the rate of the search increases and as the compression ratio increases. When the read position has moved to the selected location, the multiplexed signal is read from the DSM 10 and fed into the separation circuit 21. The header separation circuit 22 and the demultiplexer 23 separate the video signal and supply it to the video decoder 25. The video decoder 65 decodes the I-picture that appears first, and feeds it to the video output. The audio decoder 66 is muted in search mode.

In the manner just described, a search operation that successively reproduces I-pictures is performed by carrying out repeated random accesses. Thus, when, for example, the user commands a high-speed forward search, the video decoder 25 searches for an I-picture by skipping a predetermined number of frames of the video signal it receives, and then decodes and feeds out each resulting I-picture. Alternatively, the DSM 10 can search for I-pictures, and only reproduce video signals of I-pictures for decoding by the video decoder 25. A search operation involving a successive reproduction of I-pictures is carried out by repeating such operations.

A different example of a conventional recording apparatus and a different example of a conventional reproducing apparatus are shown in FIGS. 7 and 8, respectively. Referring to FIG. 7, the digital video signal to be recorded is fed into the video encoder 1, and the digital audio signal to be recorded is fed into the audio encoder 2. The outputs of the video encoder 1 and the audio encoder 2 are fed into the multiplexing circuit 3. The output terminal of the multiplexing circuit 3 is connected to the DSM 10, where the resulting multiplexed signal is stored for a first time.

The multiplexed signal read out of the DSM 10 is fed to the Table of Contents (TOC) addition circuit 50, which adds a TOC to the beginning of the multiplexed signal. Generation of the TOC will be described in detail below. The output of the TOC addition circuit 50 is fed to the input terminal of the sector header addition circuit 51. The output of the sector header addition circuit 51 is fed to the Error Correction Coding (ECC) encoder 52. The output of the ECC encoder 52 is fed to the modulation circuit 53, which feeds the resulting recording signal to the cutting machine 54, which cuts the optical disk master 60. Plural optical disks for distribution to consumer or professional users, such as the optical disk 60A shown in FIG. 8, are manufactured using the optical disk master 60.

The input terminal of the entry point storage device 33A is connected to the output terminal of the video encoder 1, or to the video entry point detection circuit 31, so that it receives and stores entry point information from either one of them. The output of the entry point storage device 33A is fed to the TOC generation circuit 56, which arranges the format of the TOC. The TOC is fed to the TOC addition circuit 50, which adds the TOC to the beginning of the multiplexed signal, as described above.

The video signal to be recorded is compressed and coded by the video encoder 1, and then fed to the multiplexing circuit 3. The audio signal to be recorded is compressed and coded by the audio encoder 2, and then fed to the multiplexing circuit 3. The multiplexing circuit 3 multiplexes the coded video signal and the coded audio signal it receives using time-division multiplexing. The multiplexed signal is fed into the DSM 10, which stores it. This process is continued until all of the video signal and all of the audio signal have been recorded on the DSM 10.

An output of the video encoder 1 is connected to the entry point storage device 33A. When the video encoder 1 is capable of providing an entry point generation signal, it provides an entry point generation signal when it generates an I-picture. The entry point storage device 33A receives from the video decoder 1, and stores, the entry point generation signal generated each time the video encoder generates an I-picture.

An output of the video encoder 1 is also connected to the input terminal of the video entry point detection circuit 31. When the video encoder 1 is incapable of providing an entry point generation signal, or when the digital video signal to be recorded is already encoded, the video entry point detection circuit 31 either generates an entry point generation signal each time an I-picture is generated, or detects the entry points in the video signal it receives from the video encoder 1, and provides an entry point generation signal in response. The entry point storage device 33A receives from the video entry point detection circuit 31, and stores, an entry point generation signal each time an entry point is detected.

After the video signal and the audio signal have been coded and multiplexed, the resulting multiplexed signal is written in the DSM 10. Simultaneously, the entry points required to construct a TOC are all stored in the entry point data storage device 33A. Then, processing for adding the TOC is started.

First, the required entry points are fed from the entry point storage device 33A to the TOC generation circuit 56. A selection is then made by the user or a controller (not shown). The entry points fed to the TOC generation circuit 56 are arranged in the format shown in FIG. 9. In this example, the TOC includes the positions of N entry points. Each entry point is indicated by a sector address of 4 bytes.

Returning to FIG. 7, the TOC generated by the TOC generation circuit 50 is delivered to the TOC addition circuit 50, whence it is fed to the sector header addition circuit 51 ahead of the multiplexed signal stored in the DSM 10. Then, following the TOC, the multiplexed signal passes from the DSM 10, through the TOC addition circuit 50, to the sector header addition circuit 51.

As shown in FIG. 10, each sector has a sector header of 16 bytes, and accommodates 2,048 bytes. The sector header includes the sector number of the sector. The sector header addition circuit 51 divides multiplexed signal received from the TOC addition circuit 50 into blocks of 2,048 bytes, and adds a sector header of 16 bytes that includes the sector number. The output of the sector header addition circuit 51 is fed into the error correction coding (ECC) encoder 52.

The ECC encoder 52 adds a prescribed amount of parity data to the multiplexed signal received from the sector header addition circuit 51, and feeds the resulting signal to the modulation circuit 53. The recording signal from the modulation circuit 53 is fed to the cutting machine 54, which writes the recording signal onto the optical disk master 60.

In the reproducing apparatus shown in FIG. 8, the signal recorded on the optical disk 60A is reproduced by the pickup 61. The output signal from the pickup 61 is fed into the demodulation circuit 62, which demodulates the signal from the pickup 61, and feeds the demodulated signal into the ECC circuit 63. The ECC circuit 63 detects and corrects errors in the demodulated signal, and feeds the resulting multiplexed signal into the demultiplexer circuit 64.

The video signal 66 demultiplexed by the demultiplexer circuit 64 is fed into the video decoder 65, while the audio signal is fed from the demultiplexer circuit to the audio decoder 66. The video decoder 65 and the audio decoder 66 individually reverse the compression of the compressed signals to provide uncompressed video and audio output signals, respectively.

In response to an instruction from the user (not shown) to reproduce the signal recorded on the disc, the controller 67 sends a command to the video decoder 65 and the audio decoder 66, and provides an access command to the drive control circuit 69. The drive control circuit 69 drives the pickup 61 using the tracking servo circuit 70 in accordance with the command from the controller 67 to begin reproducing from the disc.

The TOC at the beginning of the signal recorded on the disk is separated by the demultiplexer circuit 64, fed to the controller 67, and stored in the TOC storage device 68. The TOC is read out from the TOC storage device 68 when necessary, to be used by the controller 67.

Operation of the conventional disk reproducing apparatus shown in FIG. 8 will now be described. When the optical disk 60A is inserted, the controller 67 delivers a first sector reading command to the drive control circuit 69. The drive control circuit 69 drives the pickup 61 by way of the tracking servo circuit 70 to start reproducing from the first sector on the disk 60A.

The pickup 61 illuminates the optical disk 60A with a laser beam, and reproduces the signal recorded on the optical disk 60A using reflected light from the disk. The signal from the pickup 61 is fed to, and is demodulated by, the demodulation circuit 62. The demodulated signal is fed to the ECC circuit 63, where error detection and correction are performed. The resulting multiplexed signal from the ECC circuit is fed to the demultiplexer circuit 64.

The TOC is recorded in first sector of the disk. The TOC is demultiplexed by the demultiplexer circuit 64 and is fed to the controller 67. The controller 67 stores the TOC in the TOC storage device 68, and displays the TOC to the user (not shown) on a display (not shown).

In response to an instruction from the user (not shown) to reproduce an item selected from the TOC, the controller 67 delivers a command to the drive control circuit 69 to start operation. The drive control circuit 69 drives the pickup 61 by way of the tracking circuit 70 to start reproducing at the read position on the disk 60A indicated by the user's selection from the TOC. The drive control circuit 69 also simultaneously delivers a command to the video decoder 65 and to the audio decoder 66 to prepare to decode the signals reproduced from the disk.

Simultaneously with reading the TOC, the pickup 61 illuminates the optical disk 60A with a laser beam, and reproduces the signal recorded on the disk using reflected light from the disk. The signal from the pickup 61 is fed to, and is demodulated by, the demodulation circuit 62. The demodulated signal is fed to the ECC circuit 63, where error detection and correction are performed. The resulting multiplexed signal is fed into the demultiplexer circuit 64.

The video signal demultiplexed by the demultiplexer circuit 64 is fed to the video decoder 65, while the audio signal demultiplexed by the demultiplexer circuit is fed to the audio decoder 66. The video signal and the audio signal, which are compressed, are expanded by the video decoder 65 and the audio decoder 66, respectively, to provide an uncompressed digital video signal and an uncompressed digital audio signal.

When the video signal fed into the multiplexer 3 is compressed in accordance with the MPEG coding standard, this imposes a limitation on performing random access or searching operations. In particular, as described above, a video signal compressed according to the MPEG standard includes intra-picture coded pictures, I (intra) pictures, and two types of inter-picture coded pictures: P (forward predictive) pictures and B (bidirectional predictive) pictures. Of the three types of pictures, only I-pictures are coded independently of other pictures. To decode the video signal of an I-picture requires only the video signal of the I-picture itself, and does not require video signals relating to other pictures. Hence, an I-picture picture can be decoded by itself. However, because of this, the compression efficiency of I-pictures is low. Since P-pictures and B-pictures are obtained by decoding difference signals from preceding and/or following reference pictures, the compression efficiency of such pictures is high. However, to decode a P-picture or a B-picture requires that the video signal of a reference picture preceding or following the picture be decoded in addition to the video signal of the picture. Consequently, during a search, only about two I-pictures are normally reproduced each second. This provides a a random access facility while retaining an acceptable average compression efficiency.

The digital video signal including I-pictures, P-pictures and B-pictures recorded on the optical disk 60A is divided into more than one Groups of Pictures (GOPs) as described above with reference to FIG. 6. As described above, each GOP begins with an I-picture. When the video signal is compressed at a fixed rate, since an I-picture periodically appears at a predetermined location, the location can be determined by calculation and the I-picture accessed. However, when the video signal is compressed at a variable rate, the location of the I-pictures is indeterminate, and it is thus difficult to access the I-pictures.

In particular, when a search command is received by the disk reproducing apparatus shown in FIG. 8, the controller 67 delivers to the drive control circuit 69, the video decoder 65, and the audio decoder 66, an instruction to transition to search mode. In search mode, the video decoder 66 decodes only the I-pictures in the video signal it receives. Alternatively, only video signals representing I-pictures are selected and fed by the demultiplexer circuit 64 to the video decoder 65. The video decoder 65 then decodes the video signals that it receives.

In search mode, the drive control circuit 69 commands the tracking servo circuit 70 to move the read position on the disk forwards or backwards. The amount of movement of the read position then depends upon the search rate, the compression ratio, etc.; generally, the amount of movement increases as the rate of the search increases, and as the compression ratio increases. When the read position has moved to the selected location, the signal from the pickup 21 is fed to the demultiplexer circuit 64 via the demodulation circuit 62, and the ECC circuit 63. The demultiplexer circuit 64 demultiplexes the video signal and supplies it to the video decoder 65. The video decoder 65 decodes the I-picture that appears first, and feeds it to the video output. The audio decoder 66 is muted in search mode.

In the manner just described, a search operation that successively reproduces I-pictures is performed by carrying out repeated random accesses. Thus, when, for example, the user commands a high-speed forward search, the video decoder 25 searches for an I-picture by skipping a predetermined number of frames of the video signal it receives, and then decodes and feeds to the output each resulting I-picture. Alternatively, in response to an instruction from the controller 67, the drive control circuit 69 can drive the tracking servo circuit 70 to search for I-pictures, and only the video signals of I-pictures are supplied to, and decoded by, the video decoder 65. A search operation involving a successive reproduction of I-pictures is carried out by repeating such operations.

OBJECTS AND SUMMARY OF THE INVENTION

In the conventional apparatus, because the position of an I-picture (i.e., an access point) is not known, the search process must wait for an access point to appear after the read position has been moved by some amount. Consequently, the search operation can have a cycle time that is so long that rapid searching is difficult.

The present invention has been made in view of the situation just described, and makes it possible to locate the access point rapidly to achieve rapid searching.

Accordingly, a first aspect of the invention provides an apparatus for preparing a variable-rate coded signal, generated by compressing a digital input signal using a variable compression ratio and including a signal portion of a predetermined type, for recording on a recording medium. The apparatus comprises a circuit that generates a flag signal indicating the signal portion of the a predetermined type in the variable-rate coded signal. A signal-type marker generating circuit generates a signal-type marker in response to the flag signal. Finally, the apparatus includes a circuit that multiplexes the signal-type marker with the variable-rate coded signal to produce a multiplexed signal. The signal-type marker is located adjacent to the signal portion of the predetermined type to indicate the signal portion of the predetermined type in the multiplexed signal.

Where the multiplexed signal is divided into packs of plural packets, the signal marker is included in an entry pack located immediately preceding a packet that includes the signal portion of the predetermined type. Where the multiplexed signal is divided into sectors and each sector includes a sector header, the signal marker is included as subcode in the sector header of a sector that includes the signal portion of a predetermined type.

Each signal marker may include location information showing the location on the recording medium of an additional signal-type marker and its accompanying signal portion of the predetermined type. Each signal marker may include location information showing the locations on the recording medium of plural additional signal-type markers successively preceding and following the signal-type marker.

When the digital input signal is a video signal comprising plural pictures compressed either in an intra-picture mode or an inter-picture mode, a signal-type marker is generated when the picture is compressed in the intra-picture mode.

The invention also provides a method for preparing a variable-rate coded signal, generated by compressing a digital input signal using a variable compression ratio and including a signal portion of a predetermined type, for recording on a recording medium. According to the method of the invention, a flag signal is generated indicating the signal portion of the predetermined type in the variable-rate coded signal. A signal-type marker is generated in response to the flag signal. Finally, the signal-type marker is multiplexed with the variable-rate coded signal to produce a multiplexed signal. The signal-type marker is located adjacent to the signal portion of the predetermined type to indicate the signal portion of the predetermined type in the multiplexed signal.

Where the multiplexed signal is divided into packs of plural packets, the signal marker is included in an entry pack, and the multiplexing step locates the entry packet immediately preceding a packet that includes the signal portion of the predetermined type. Where the multiplexed signal is divided into sectors and each sector includes a sector header, the multiplexing step includes the signal marker as subcode in the sector header of a sector that includes the signal portion of a predetermined type.

The step of generating a signal marker may generate a signal marker including location information showing the location on the recording medium of an additional signal-type marker and its accompanying signal portion of the predetermined type. Signal markers may also be generated that include location information showing the locations on the recording medium of plural additional signal-type markers successively preceding and following the signal-type marker.

When the digital input signal is a video signal comprising plural pictures compressed either in an intra-picture mode or an inter-picture mode, the step of generating a signal-type marker generates a signal marker when the picture is compressed in the intra-picture mode.

The invention further provides an apparatus for successively reproducing portions of a multiplexed signal recorded on a recording medium to effect a high-speed search. The multiplexed signal includes a variable-rate coded signal and signal-type markers identifying signal portions of a predetermined type in the variable-rate coded signal. The apparatus comprises a system that reproduces a portion of the multiplexed signal from a read position on the recording medium. A demultiplexing circuit demultiplexes the variable-rate coded signal and a signal-type marker from the portion of the multiplexed signal. The apparatus also includes a control circuit that changes the read position in response to the signal-type marker.

The signal-type marker may include location information indicating a location on the recording medium of an additional signal-type marker, in which case, the control circuit changes the read position in response to the location information in the signal-type marker. The control circuit may include a circuit for extracting the location information from the signal-type marker, and may change the read position to a new read position indicated by the location information. Then, the reproducing system reproduces the multiplexed signal including the additional signal-type marker from the new read position.

The signal portion of the predetermined type may be an expandable portion of the variable-rate coded signal, and an expandable portion of the variable-rate coded signal may immediately follow each signal-type marker in the multiplexed signal. At each read position, the portion of the multiplexed signal reproduced by the reproducing system includes a signal-type marker and an expandable portion of the variable-rate coded signal. The apparatus may additionally include a circuit for expanding the expandable portion of the variable-rate coded signal extracted from the reproduced multiplexed signal by the demultiplexer, and for providing the expanded expandable portion as an output signal.

The invention also provides a method of successively reproducing portions of a multiplexed signal recorded on a recording medium to effect a high-speed search. The multiplexed signal includes a variable-rate coded signal and signal-type markers identifying signal portions of a predetermined type in the variable-rate coded signal. The method according to the invention repeats the following steps: portion of the multiplexed signal is reproduced from a read position on the recording medium; the variable-rate coded signal and a signal-type marker are demultiplexed from the reproduced portion of the multiplexed signal; and the read position is changed in response to the signal-type marker.

The signal-type marker may include location information indicating a location on the recording medium of an additional signal-type marker, in which case, the read position is changed in response to the location information in the signal-type marker. The location information may be extracted from the signal-type marker, and the read position changed to a new read position indicated by the location information. Then, the multiplexed signal including the additional signal-type marker is reproduced from the new read position.

The signal portion of the predetermined type may be an intrinsically expandable portion of the variable-rate coded signal, and an intrinsically expandable portion of the variable-rate coded signal may immediately follow each signal-type marker in the multiplexed signal. At each read position, the portion of the multiplexed signal reproduced by the reproducing system includes a signal-type marker and an expandable portion of the variable-rate coded signal. The intrinsically expandable portion of the variable-rate coded signal extracted from the reproduced multiplexed signal by the demultiplexer may be expanded, and the expanded intrinsically expandable portion may be provided as an output signal.

Finally, the invention provides a recording, comprising a recording medium and a multiplexed signal recorded in the recording medium. The multiplexed signal includes a variable-rate coded signal including signal portions of a predetermined type, and a signal-type marker adjacent each signal portion of the predetermined type. The signal-type marker identifies the signal portion of the predetermined type.

The signal-type marker may include location information indicating a location on the recording medium of an additional signal-type marker, or location information indicating locations on the recording medium of plural adjacent signal-type markers successively disposed about the signal-type marker in the recording medium.

BRIEF DESCRIPTION OF THE DRAWINGS

FIG. 4 shows the stream_ID portion of the packet shown in FIG. 3.

FIG. 9 shows the structure of the Table of Contents (TOC) in the examples shown in FIGS. 7 and 8.

FIG. 14 shows the format of the entry packet shown in FIG. 13.

DETAILED DESCRIPTION OF THE INVENTION

Figure 1:
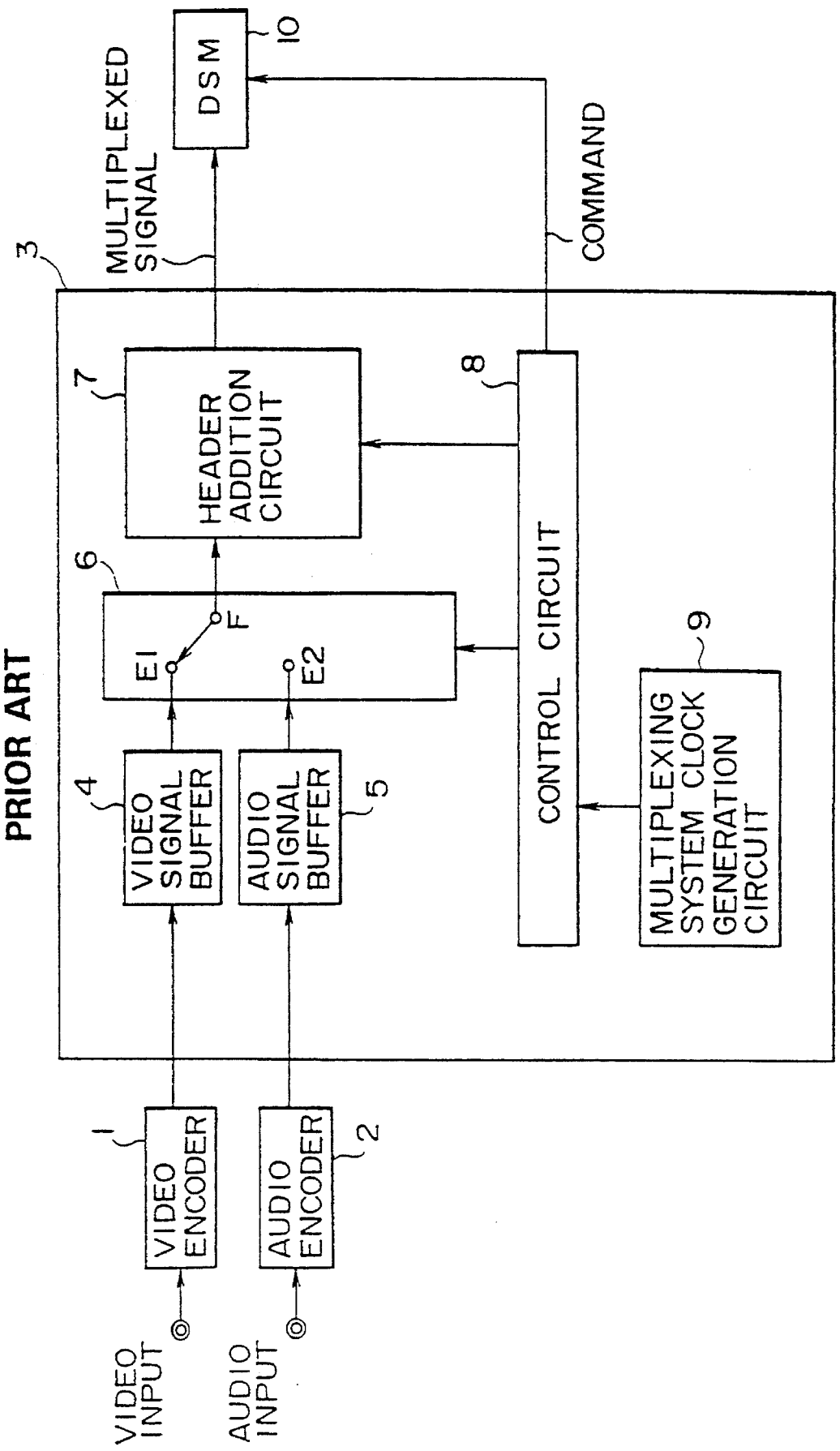
FIG. 1 is a block diagram showing the construction of an example of a conventional apparatus for recording multiplexed compressed audio and compressed video signals.
Figure 2:
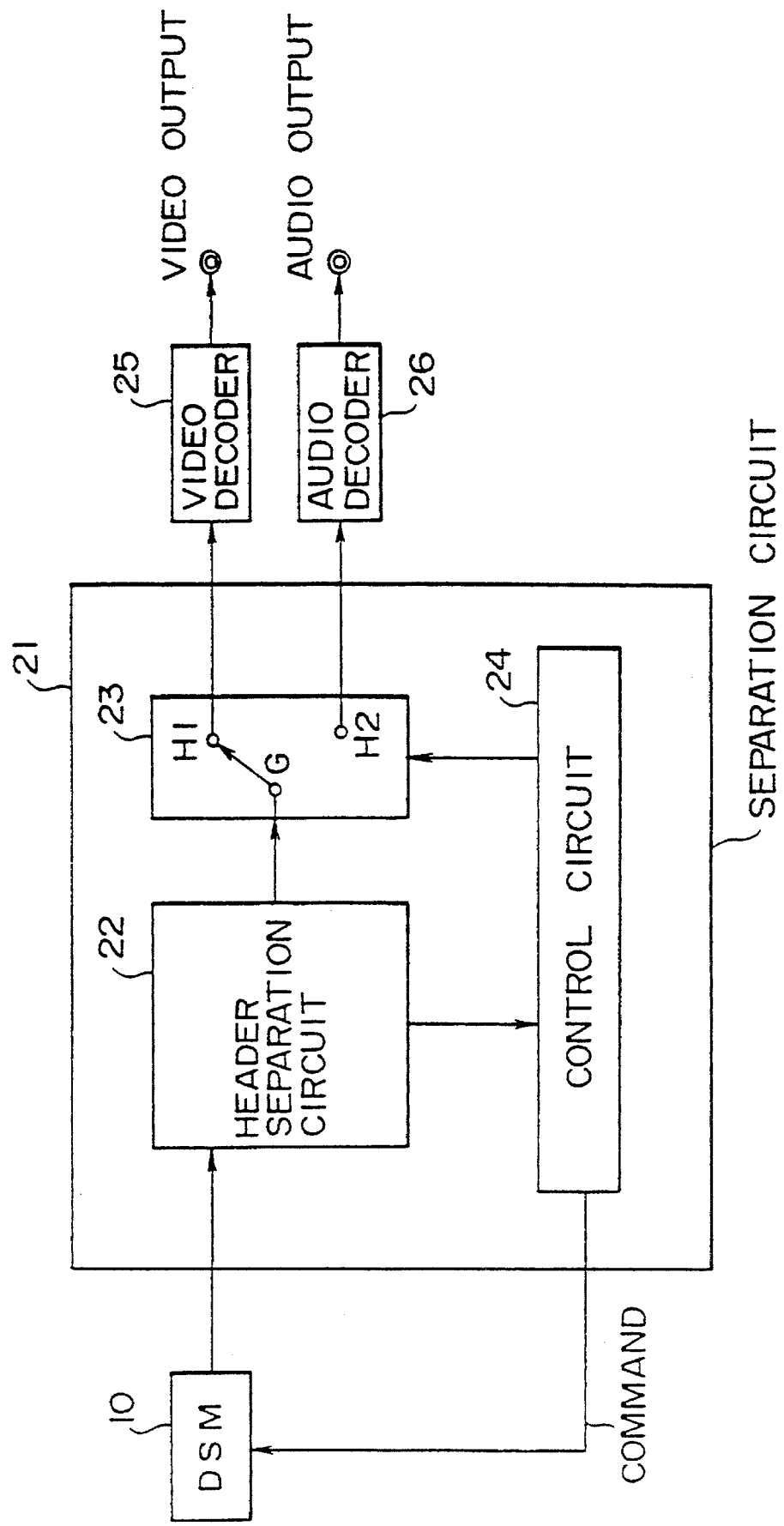
FIG. 2 is a block diagram showing the construction of an example of a conventional apparatus for reproducing multiplexed compressed audio and compressed video signals.
Figure 11:
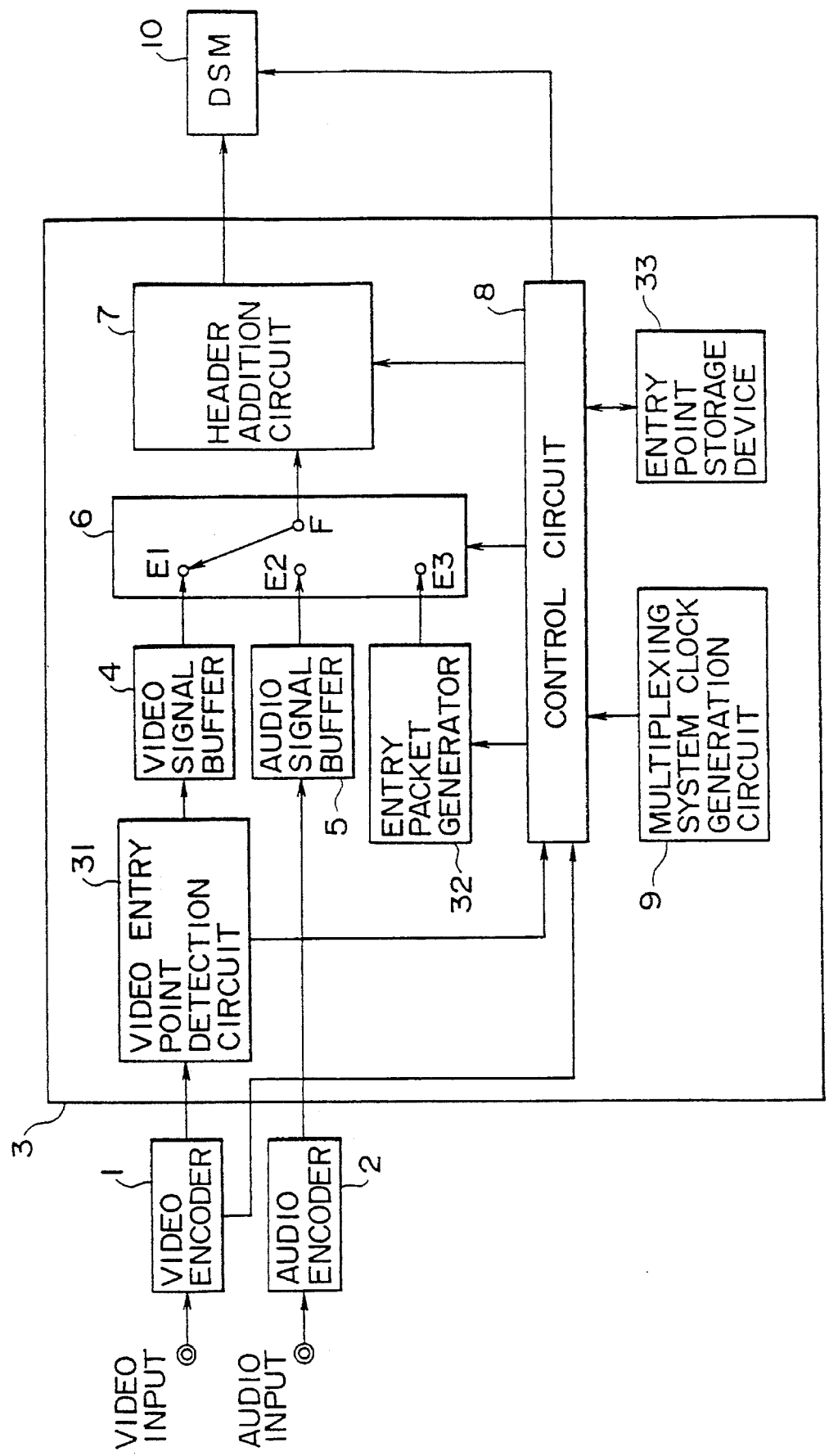
FIG. 11 is a block diagram showing the construction of an embodiment of a recording apparatus according to of the present invention.
Figure 12:
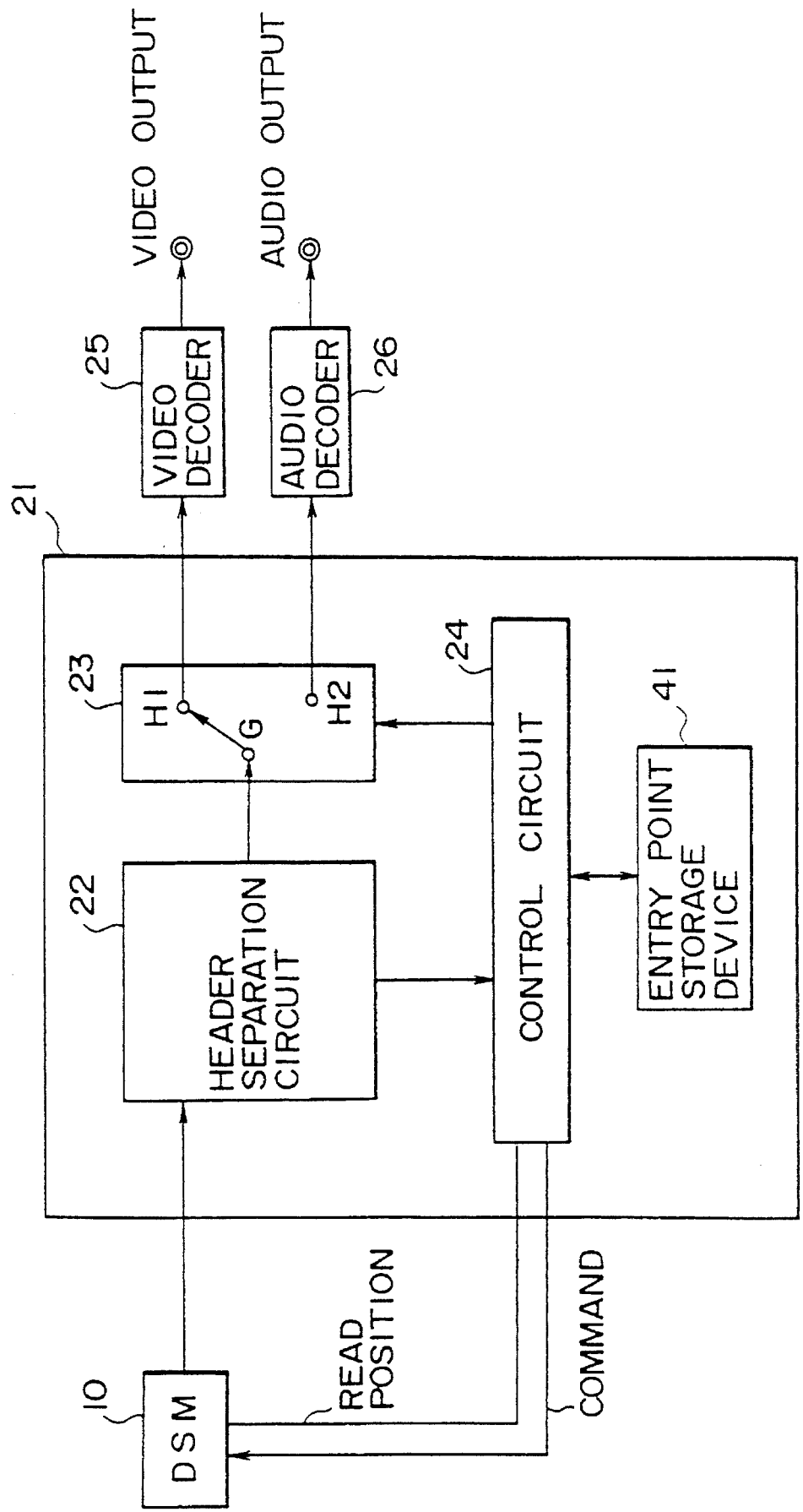
FIG. 12 is a block diagram showing the construction of an embodiment of reproducing apparatus according to the present invention.

FIGS. 11 and 12 are block diagrams showing the construction of a first embodiment of a recording apparatus and a reproducing apparatus according to the present invention. Components corresponding to those in the conventional apparatus shown in FIGS. 1 and 2 are indicated by the same reference characters.

In the recording apparatus shown in FIG. 11, the output terminal of the video encoder 1 is connected to the input terminal of the video entry point detection circuit 31, an output terminal of which is connected to the input terminal of the video signal buffer 4. The entry packet generation circuit 32 receives a control input from the control circuit 8, and supplies entry packets to the input terminal E3 in the switching circuit 6. The control circuit 8 also receives system clock signals from the multiplexing system clock generation circuit 9, and causes the switching circuit 6 to connect the output terminal F to the input terminals E1, E2, and E3 successively at a predetermined time interval. This successively fetches, and multiplexes by time-division multiplexing, the video signal from the video signal buffer 4, the audio signal from the audio signal buffer 5, and entry packets from the entry packet generation circuit 32. The resulting time-division multiplexed signal is fed to the header addition circuit 7.

The control circuit 8 also causes the header addition circuit 7 to add a video packet header to the video signal read out from the video signal buffer 4, and to add an audio packet header to the audio signal read out from the audio signal buffer 5.

The control circuit 8 also receives as an input the entry point generation signal generated in response to an I-picture supplied by the video encoder 1 or the video entry point detection circuit 31, and causes the entry packet generation circuit 32 to insert an entry packet at a predetermined position in the video signal. When the video encoder 1 is capable of providing an entry point generation signal, it provides an entry point generation signal each time it generates an entry point. On the other hand, when the video encoder 1 is incapable of providing an entry point generation signal, or when the video signal to be recorded is already coded, the video entry point detection circuit 31 generates the entry point generation signal. The video entry point detection circuit 31 generates an entry point generation signal when an I-picture is generated, or when it detects an entry point in the video signal it receives from the video encoder 1. The entry point storage device 33 is a memory that can be read and written by the control circuit 8, and which stores the position of each detected entry point. The construction of the rest of the apparatus is similar to that shown in FIG. 1.

Figure 3:
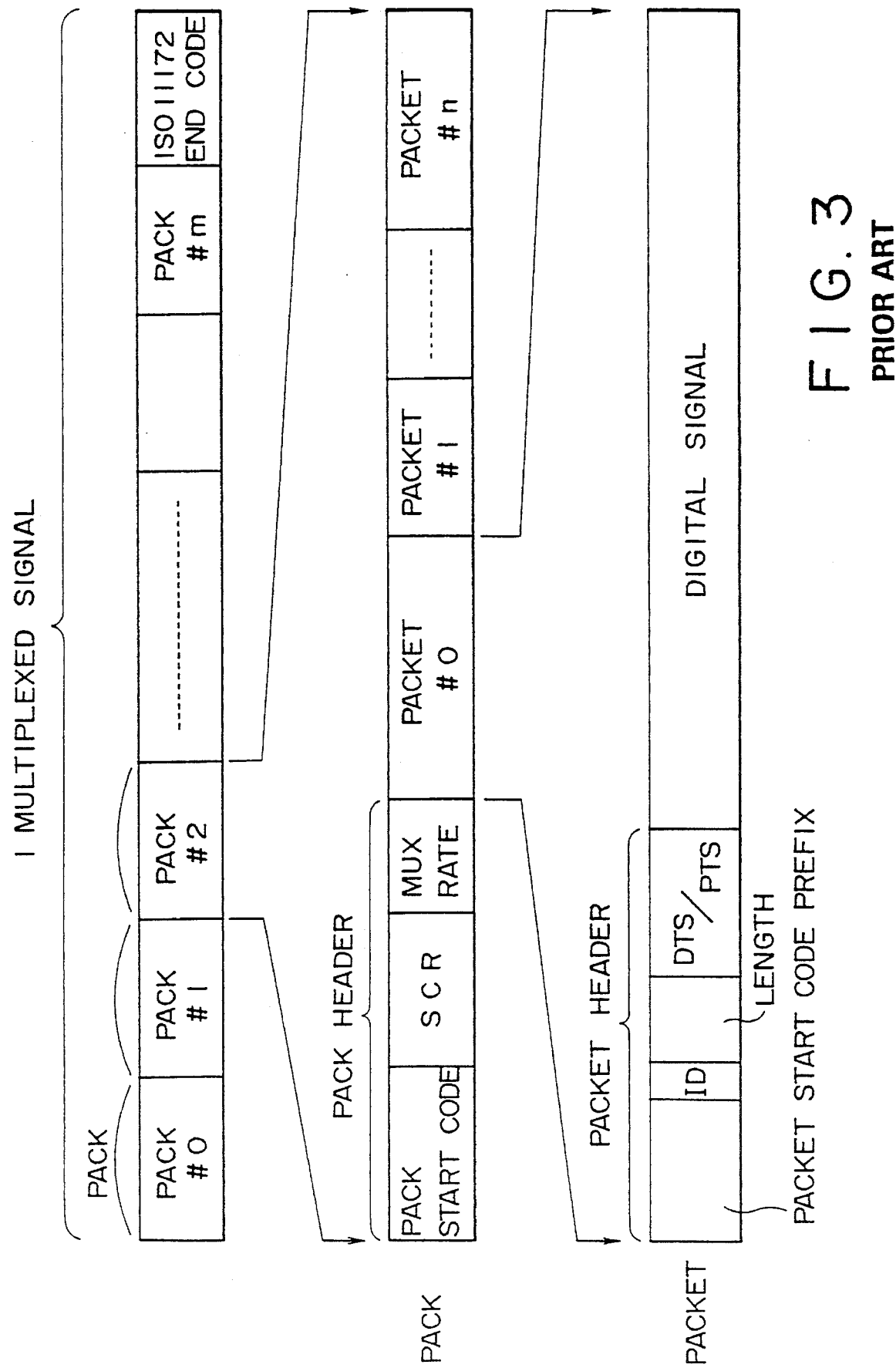
FIG. 3 shows the format of the multiplexed signal in the examples shown in FIGS. 1 and 2.

In the embodiment shown in FIG. 11, the multiplexed signal includes at least one pack, and an ISO_11172_end_ code. Each pack has the pack format shown in FIG. 3. The pack begins with a Pack_Header consisting of a Pack_ Start_Code, an SCR, and a MUX_Rate. Following the Pack_Header is a video packet consisting of a Video_ Packet_Header followed by a portion of the video signal that includes no I-picture. Following the video packet is an entry packet, followed by another video packet consisting of a Video_Packet_Header and a portion of the video signal that includes an I-picture. Thus, an entry packet is located immediately prior to the Video_Packet_Header of a video packet that includes an I-picture, i.e., an entry point. Also, an audio packet, consisting of an Audio_Packet_Header followed by a portion of the audio signal follows the video packet.

The entry packet has the format illustrated in FIG. 14. The format corresponds to the packet format of the private_ stream_2 packet defined by the MPEG standard. The entry packet begins with a Packet_Start_Code_Prefix, followed by a stream_ID of 0xBF in hexadecimal notation, and the length of the packet. This arrangement is similar to that of the packet header shown in FIG. 3.

In the entry packet according to the present embodiment, a **_id follows the packet length. The _id indicates that the private_stream_2 packet has a format peculiar to the party identified by . Following the _id, the **_packet_type is disposed, which identifies the packet type from among the private packet types belonging to the identified party, and is set to 0xFF for an entry packet. There then follows current_#_data_streams, current_#_video_ streams, and current_#_audio_streams indicating the number of data streams, the number of video streams, and the number of audio streams multiplexed immediately prior to the current entry point.

Following current_#_audio_streams are entry_ packet_−3, entry_packet_−2, entry_packet_−1, entry_ packet_+1, entry_packet_+2, and entry_packet_+3. These indicate the relative distances between the position of the current entry point and the positions of the three previous entry points and the three following entry points in terms of the number of sectors of the disk in the DSM 10. Alternatively, the positions of the preceding and following entry points can be indicated in terms of absolute locations on the DSM 10.

Figure 13:
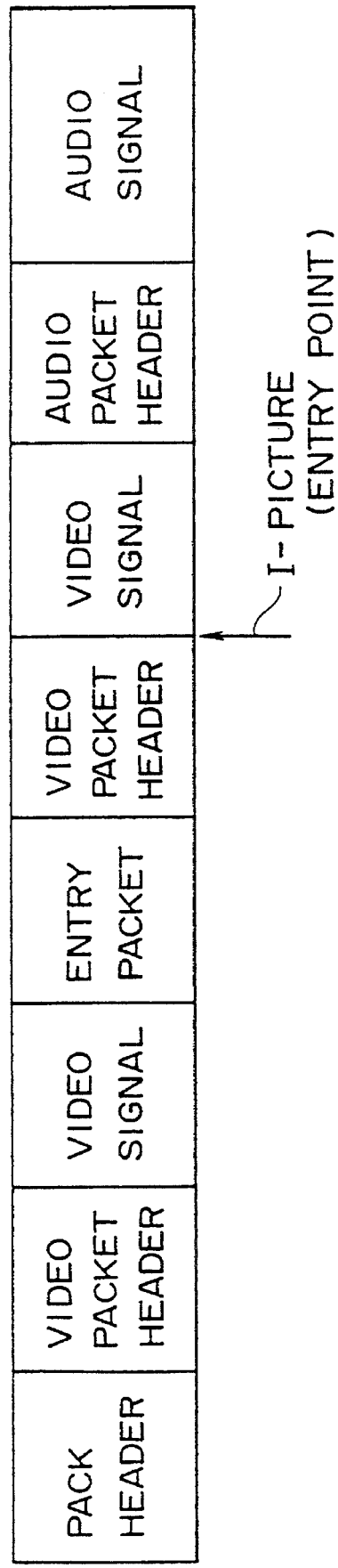
FIG. 13 shows the pack format on the disk of the DSM 10 of the embodiment shown in FIGS. 11 and 12.

Operation of the embodiment shown in FIG. 11 will now be described. The control circuit 8 receives an entry point generation signal from the video encoder 1 or from the entry point detection circuit 31, and inserts an entry packet immediately prior to the entry point (FIG. 13). In particular, when the control circuit 8 receives an entry point generation signal, the control circuit 8 causes the entry packet generation circuit 32 to generate an entry packet. The control circuit also causes the switching circuit 6 to switch to the input terminal E3 so that the entry packet can be multiplexed with the video signal and the audio signal from the signal buffers 4 and 5, respectively, and supplied to the header addition circuit 7.

As shown in FIG. 14, in each entry packet, the distances between the current entry point and the positions of the three previous entry points and the three following entry points are recorded in entry_packet_−3, entry_packet_−2, entry_packet_−1, entry_packet_+1, entry_packet_+2, and entry_packet_+3, respectively. When storing the positions of the three prior entry points in the entry packet storage device 33, this information is known and could be recorded on the DSM 10 when the current entry point is recorded. However, the positions of the following entry points are not known when the current entry packet is recorded on the DSM 10. Therefore, the control circuit 8 stores the positions of all the entry points in the entry point storage device 33. Then, after all of the signals to be recorded have been recorded on the DSM 10, the control circuit 8 reads out from the entry point storage device 33 the positions of the three previous entry points and the three following entry points for each entry point. The control circuit 8 calculates from the read out position information the distance between the current_entry point and the three previous and the three following entry points, and supplies the calculated relative positions to the DSM 10, which inserts them into each entry packet recorded on the DSM 10. Alternatively, the addresses of the three previous and the three following entry points can be inserted into the entry packet.

Since the video encoder 1 and the audio encoder 2 encode the video signal and the audio signal, respectively, at a variable rate, the control circuit 8 causes the multiplexer 6 to include a total of 2,048 bytes in each pack. To achieve this, the control circuit 8 controls header addition, signal reading from the signal buffers 4 and 5, and entry packet insertion using an algorithm such as that shown, for example, in FIG. 15.

Figure 5:
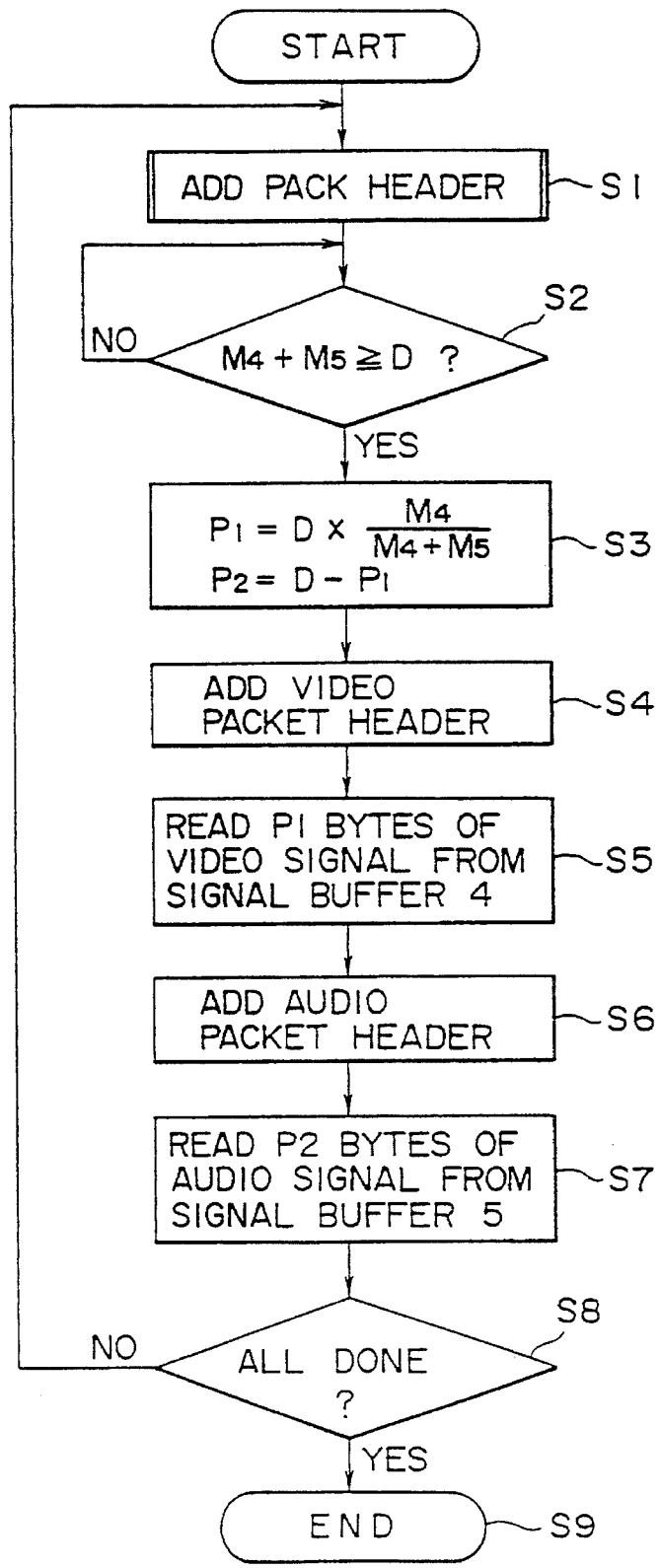
FIG. 5 is a flow chart illustrating part of the operation of the example shown in FIG. 1.
Figure 6:
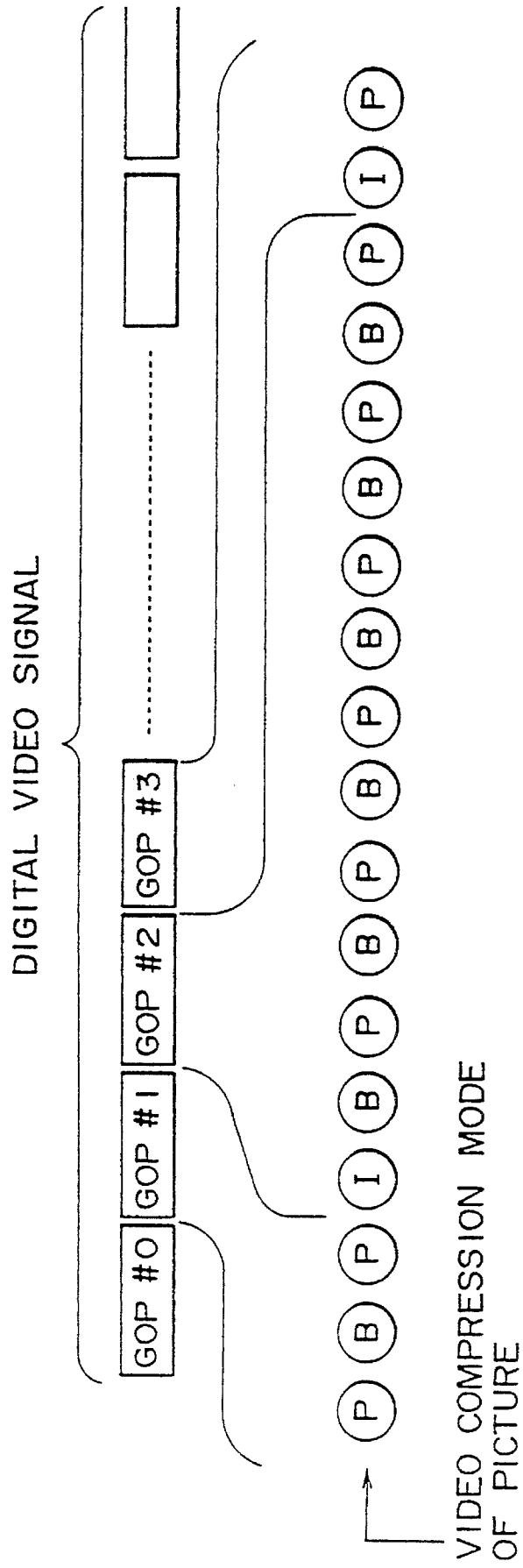
FIG. 6 shows part of the compressed video signal recorded on the disk of the DSM shown in FIGS. 1 and 2.

Similar to the processing shown in FIG. 5, M4 represents the number of bytes of video signal accumulated in the video signal buffer 4, and M5 represents the number of bytes of audio signal accumulated in the audio signal buffer 5. Further, D represents the total number of signal bytes in one pack. For simplicity, it will be assumed that D is a constant obtained by subtracting the number of bytes in the pack header, the number of bytes in the video packet header, and the number of bytes in the audio packet header from the number of bytes (2,048) in the pack. D2 represents the total number of signal bytes in a pack that includes an entry packet. D2 is obtained by subtracting the number of bytes in the entry packet and the number of bytes in the second video packet header from D.

Figure 15:
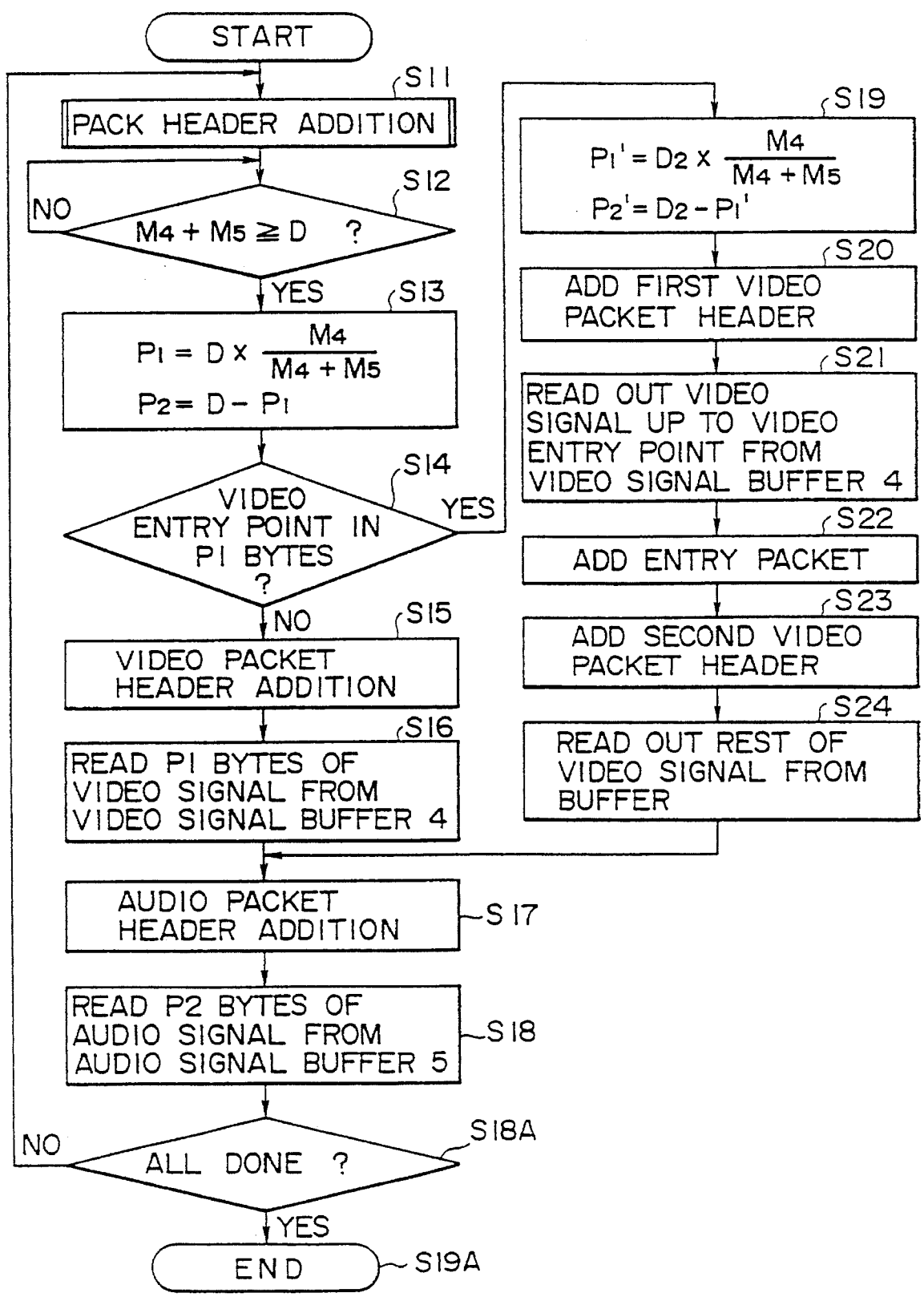
FIG. 15 is a flow chart illustrating part of the operation of the embodiment shown in FIG. 11.

In the algorithm shown in FIG. 15, in step S 11, the control circuit 8 first instructs the header addition circuit 7 to generate a pack header. Then, at step S12, the control circuit 8 waits until the sum of M4 and M5 is equal to or greater than the number of signal bytes D accommodated by one pack. In other words, the control circuit 8 waits until after the total number of signal bytes accumulated in the signal buffers 4 and 5 is equal to the number of signal bytes accommodated by one pack.

At step S13, the number of bytes P1 of video signal that will be accommodated in the pack and the number of bytes P2 of audio signal that will be accommodated in the pack are calculated in accordance with the equations set forth below. P1 and P2 are calculated by distributing the total number of signal bytes D accommodated by the pack according to the ratio of numbers of signal bytes M4 and M5 accumulated in the respective signal buffers 4 and 5.

$$P1 = D2 \times M4/(M4+M5)$$

$$P2 = D2 - P1$$

At step S14, the control circuit 8 determines whether or not a video entry point is included in the first P1 bytes of the M4 bytes of video signal. If there is no video entry point in the video signal to be accommodated in the pack, at step S 15, the control circuit 8 instructs the header addition circuit 7 to provide a video packet header. Then, at step S16, P1 bytes of video signal are transferred from the video signal buffer 4 to the DSM 10. Similarly, at step S17, the control circuit 8 instructs the header addition circuit 7 to provide an audio header, and, at step S18, P2 bytes of audio signal are transferred from the audio signal buffer 5 to the DSM 10.

At the next step, step S18A, the control circuit 8 tests whether all the video signal and all of the audio signal have been multiplexed. If the result is NO, execution returns to step S 11. If the result is YES, execution proceeds to step S19A, at which step the program ends. This processing is similar to the processing described above with reference to FIG. 5.

If it is determined at step S14 that there is a video entry point in the video signal to be accommodated in the pack, the control circuit 8 first stores the position of the current pack in the entry point storage device 33, and execution branches to step S19. There, the number of bytes P1 of video signal and the number of bytes P2 of audio signal to be accommodated in the pack are calculated in accordance with the equations:

$$P1 = D2 \times M4/(M4+M5)$$

$$P2 = D2 - P1$$

The parameters calculated at step S13 are recalculated at step S19 because the number of signal bytes that can be accommodated by the pack is reduced when the pack includes an entry packet. P1 and P2 are recalculated by distributing the total number of signal bytes D2 accommodated by the pack according to the ratio of numbers of signal bytes M4 and M5 accumulated in the signal buffers 4 and 5.

At step S20, the header addition circuit 7 generates a video packet header and feeds it to the DSM 10. Then, at step S21, the control circuit 8 transfers the video signal up to immediately before the video entry point from the video signal buffer 4 to the DSM 10. At step S22, the entry packet generation circuit 32 generates the entry packet and feeds it to the DSM 10. However, the relative position information is not written in the entry packets written on the DSM 10 at this step.

At step S23, the header addition circuit 7 generates a second video packet header and feeds it to the DSM 10. At step S24, the remaining video signal bytes are transferred to the DSM 10. Then, execution returns to steps S17 and S18, where the audio packet header and P2 bytes of audio signal are transferred from the audio signal buffer 5 to the DSM 10. The DSM 10 records the resulting multiplexed signal.

At the next step, step S18A, the control circuit tests whether all the video signal and all of the audio signal have been multiplexed. If the result is NO, execution returns to step S11. If the result is YES, execution proceeds to step S19A, at which step the program ends. Then, when all of the signals to be recorded have been recorded, the relative position information is written into the entry packets already recorded on the DSM 10. The control circuit 8 reads out the position of each entry packet from the entry point storage device 33, calculates relative positions, and causes the relative positions of the three preceding entry packets and the three following entry packets to be written into each entry packet recorded on the DSM 10.

The apparatus for reproducing signals recorded by the embodiment of FIG. 11 will now be described with reference to FIG. 12. The header separation circuit 22 in the separation circuit 21 separates pack headers, packet headers and entry packets from the signal read out from the DSM 10 and supplies them to the control circuit 24. The remaining time-division multiplexed signal is supplied to the input terminal G of the switching circuit 23. The output terminals H1 and H2 of the switching circuit 23 are connected to the input terminals of the video decoder 25 and the audio decoder 26, respectively.

The control circuit 24 supplies each entry point it receives from the header separation circuit 22 to the entry point storage device 41, where it is stored. Since the current read position is supplied from the drive apparatus 10 to the control circuit 24, the control circuit 24 can store the position and the contents of each entry point in a corresponding relationship to each other.

The control circuit 24 of the separation circuit 21 causes the switching circuit 23 to connect the input terminal G successively to the output terminals H1 and H2 in accordance with the stream_ID of the packet header received from the header separation circuit 22. This demultiplexes the time-division multiplexed signal received from the header separation circuit 22 and supplies the video signal to the video decoder 25 and the audio signal to the audio decoder 26.

Operation of the multiplexed signal reproducing apparatus shown in FIG. 12 during a search will now be described. In response to a search command, the main control apparatus (not shown) instructs the control circuit 24, the video decoder 25, and the audio decoder 26 to transition into search mode. The control circuit 24 reads the current read position from the DSM 10, and extracts information indicating the relative positions of entry points around the current read position from the entry point storage device 41. The entry point storage device 41 stores the entry point information from the entry packets reproduced in the course of reproducing the disk. Alternatively, the entry point information in all entry packets recorded on the DSM 10, or the entry point information in a predetermined range of entry packets may be read out and stored in the entry point storage device 41 at predetermined times, such as when the apparatus is first switched on, when a disk is mounted in the DSM 10, or in response to a reproduce instruction.

When the control circuit 24 determines an entry point location, it sends a search instruction to the DSM 10 to move the read position at high speed to the position of the entry point. When the movement is completed, the DSM 10 begins reproducing at the entry point, and supplies the reproduced signal to the separation circuit 21. As described above with reference to FIG. 13, an entry packet is disposed immediately before the video signal of an I-picture. Accordingly, if the video signal following the entry packet is separated by the header separation circuit 22 and supplied to the video decoder 25, then the first picture of the video signal is an I-picture. The video decoder 25 immediately decodes the I-picture and feeds it to the video output outputs. The audio decoder 26 is muted in search mode.

Since the relative positions of the three preceding entry points and three following entry points are recorded in each entry packet, the control circuit 24 uses the position information of the next entry packet written in the present entry packet to move the read position to the next entry packet, which it then reproduces. By repeating this process, a more rapid succession of I-pictures is reproduced.

The control circuit 24 causes the read position to jump to a more distant entry point when the rate of search is high, but causes the read position to jump to a closer entry point when the rate of search is low. Since the relative positions of three entry points are recorded in each of the forward and reverse directions, three or more variations in the search rate are available depending upon combinations of entry point positions selected.

Figure 16:
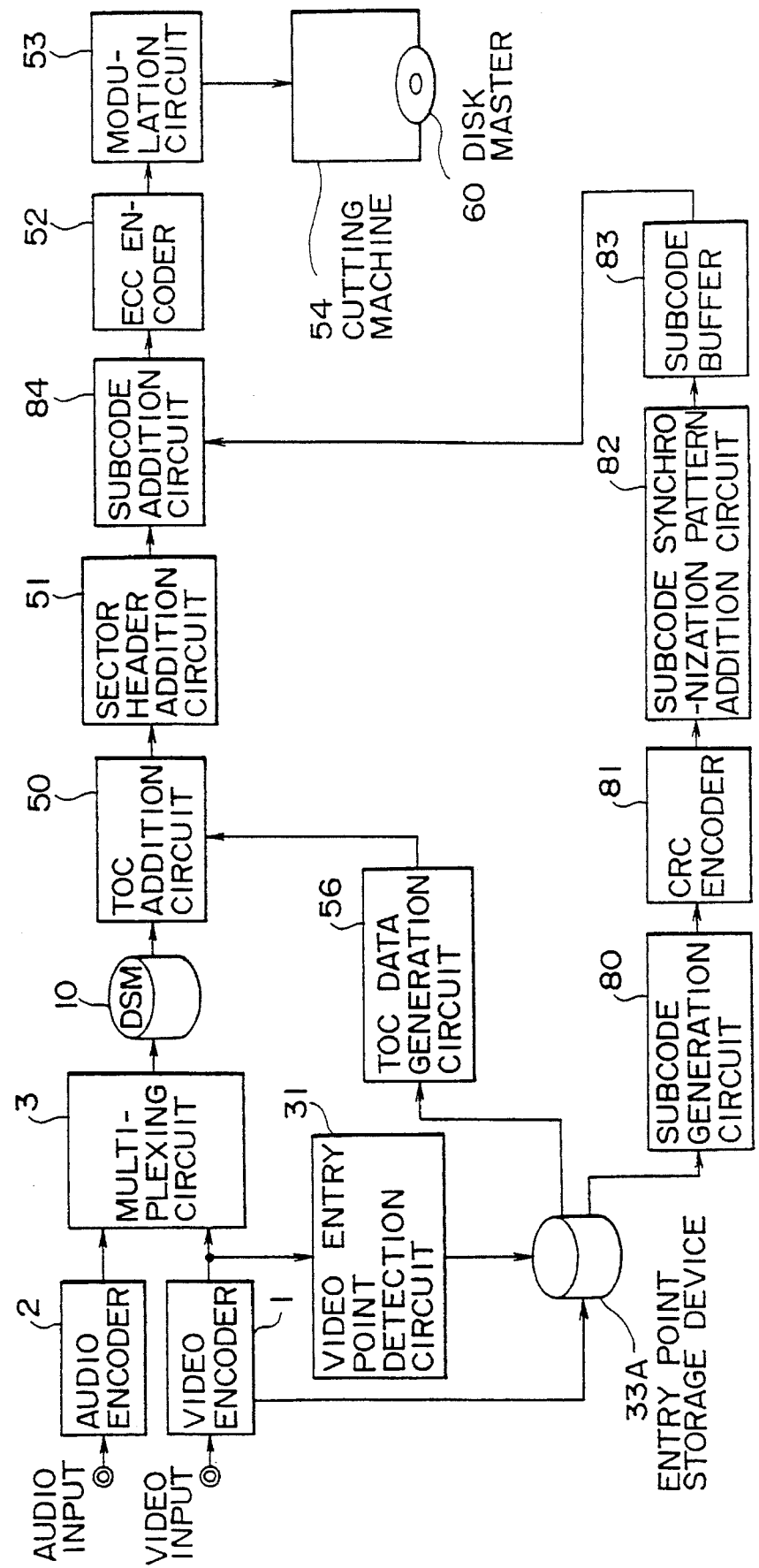
FIG. 16 is a block diagram showing the construction of another embodiment of a recording apparatus according to the present invention.
Figure 17:
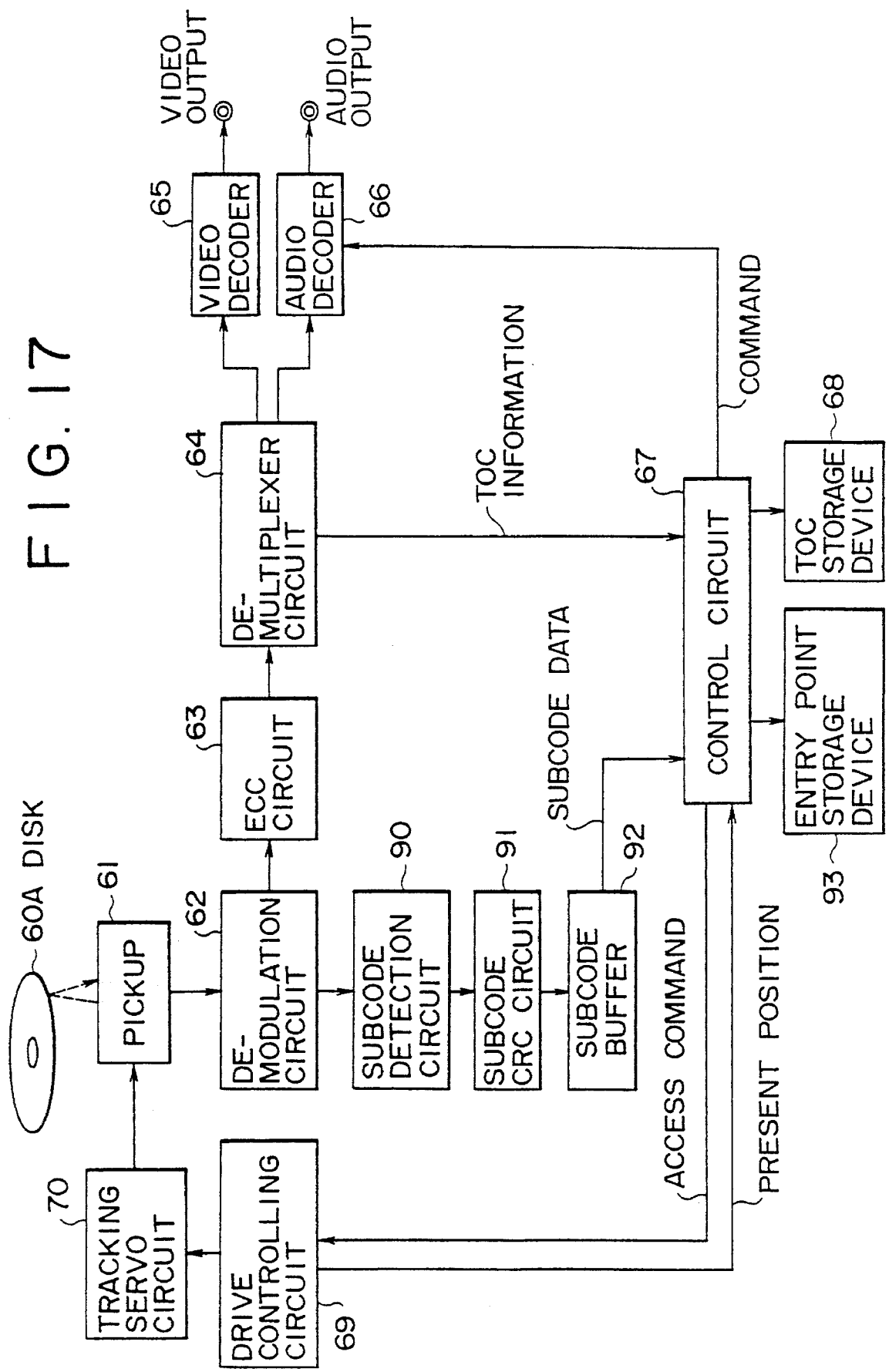
FIG. 17 is a block diagram showing the construction of another embodiment of a reproducing apparatus according to the present invention.

FIGS. 16 and 17 are block diagrams showing the construction of another embodiment of the multiplexed signal recording apparatus and the multiplexed signal reproducing apparatus of the present invention. Components corresponding to those in the conventional apparatus shown in FIGS. 7 and 8 are indicated by the same reference characters.

In the recording apparatus shown in FIG. 16, entry points stored in the entry point storage device 33A are fed to the TOC generation circuit 56 and to the subcode generation circuit 80. The output of the subcode generation circuit 80 is fed to the CRC encoder 81. The output of the CRC encoder 81 is fed to the subcode synchronization pattern addition circuit 82, the output of which is fed to the subcode buffer 83. The subcode addition circuit 84 multiplexes the signal received from the sector header addition circuit 51 with data received from the subcode buffer 83, and feeds the multiplexed signal to the ECC encoder 52. The construction of the rest of the circuit is similar to the conventional apparatus shown in FIG. 7.

Operation of the recording apparatus shown in FIG. 16 will now be described. The video signal to be recorded and the audio signal to be recorded are compressed and multiplexed, the multiplexed signal is recorded on the DSM 10, and the entry points of the video signal are stored in the entry point storage device 33A in a manner similar to that in corresponding operations in the conventional recording apparatus shown in FIG. 7. The entry points are read out of the entry point storage device 33A and fed to the TOC generation circuit 56 to generate a TOC, and the TOC is added to the beginning of the multiplexed signal by the TOC addition circuit 50 in a manner similar to that in corresponding operations in the conventional recording apparatus shown in FIG. 7.

Figure 7:
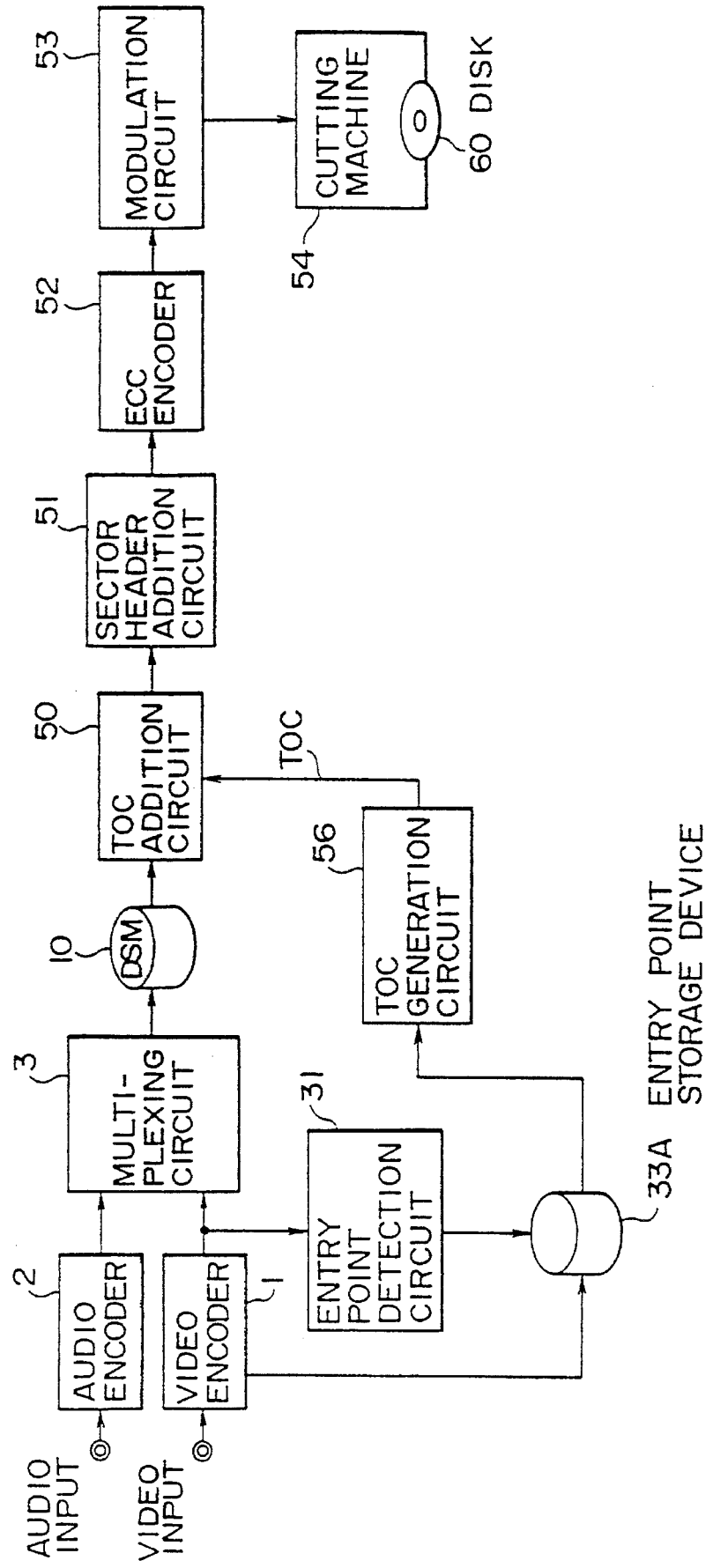
FIG. 7 is a block diagram showing the construction of another example of a conventional apparatus in which the multiplexed signal is recorded on an optical disk.
Figure 8:
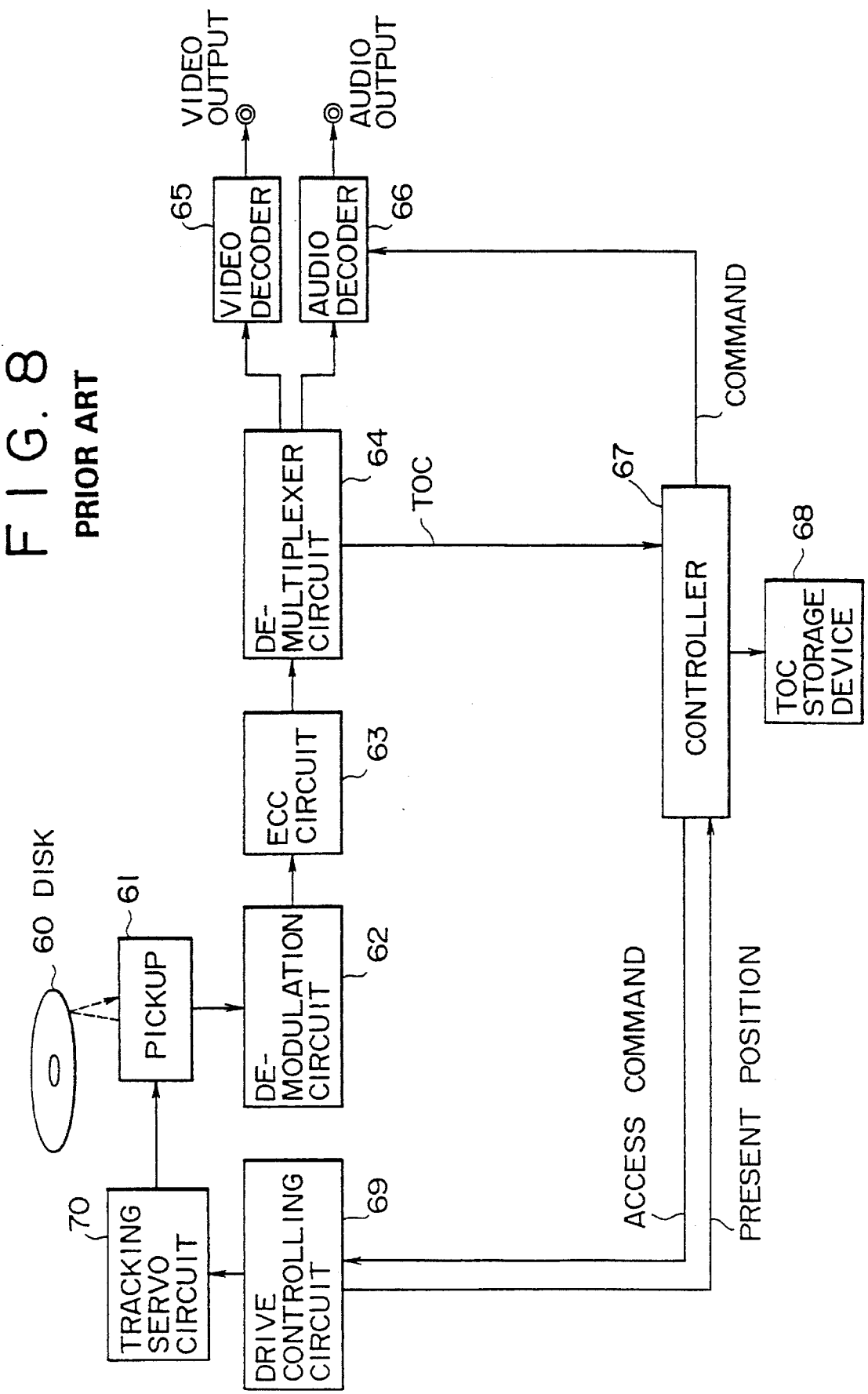
FIG. 8 is a block diagram showing a construction of another example of a conventional apparatus in which the multiplexed signal is reproduced from an optical disk.
Figure 10:
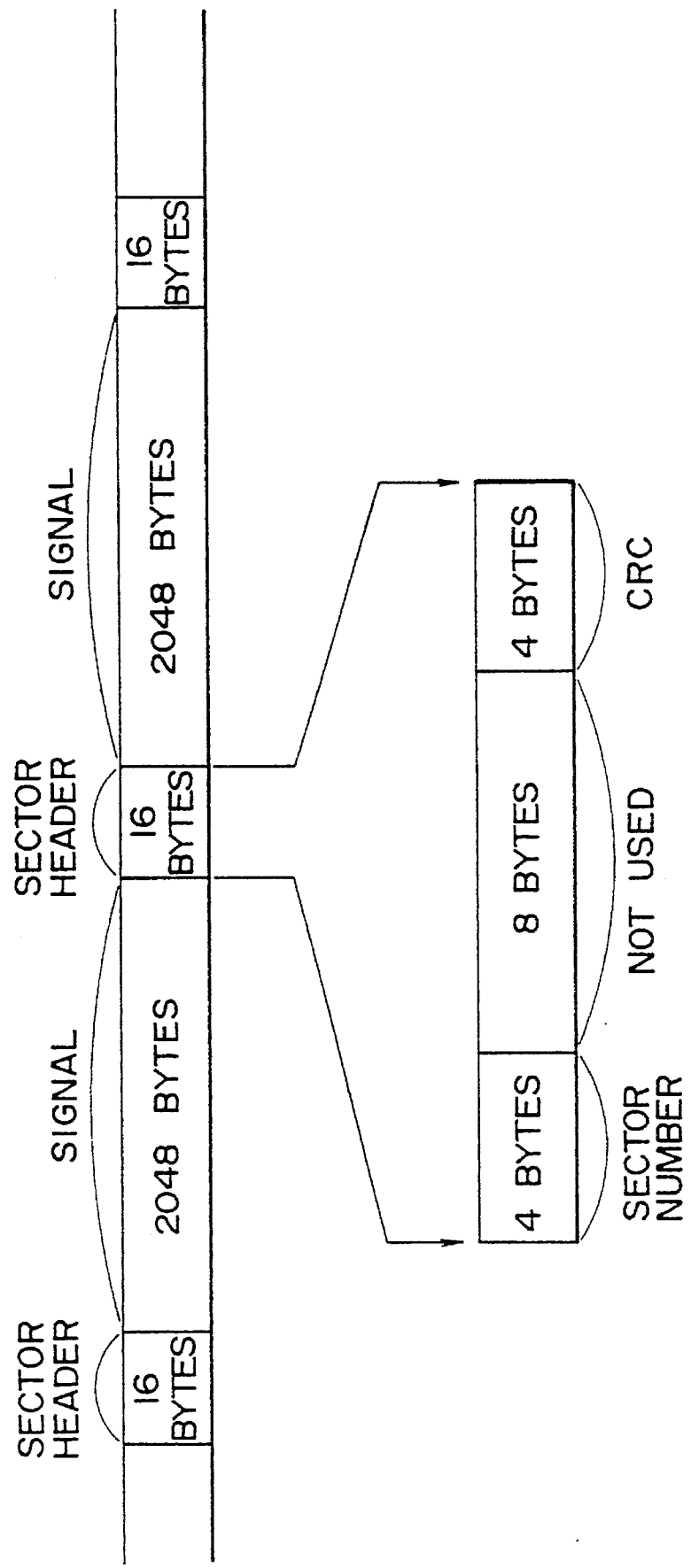
FIG. 10 shows the sector structure in the conventional examples shown in FIGS. 7 and 8.

The recording apparatus according to the invention shown in FIG. 16 differs from the conventional example shown in FIG. 7 in that entry points are additionally fed from the entry point storage device 33A to the subcode generation circuit 80. In the present embodiment, the subcode has the format shown in FIG. 19. A subcode synchronization pattern (2 bytes) is located at the beginning of the subcode. This is used so that the beginning of the subcode may be identified even if reading is started at an arbitrary sector. Following the subcode synchronization pattern is located the **_subcode_type. This indicates the type of subcode peculiar to the party identified by . A **_subcode_type of 0xFF indicates that the subcode contains entry point information. Next follows current_#_data_streams, current_#_video_streams, and current_#_audio_streams, which indicate the number of data streams, the number of video streams, and the number of audio steams multiplexed in the sector in which the subcode is included.

Following the current_#_audio_streams are successively located entry_point_−3, entry_point_−2, entry_point _−1, entry_point+1, entry_point_+2 and entry_point_+3. These indicate the relative positions of the three previous entry points and the three following entry points, in terms of the distance between the sector in which the current_entry point appears and the sector in which the previous or following entry point appears on the disk 60, which will be recorded by the cutting machine 54 in a subsequent operation. Alternatively, the entry point positions may be defined in terms of absolute sector addresses on the disk 60.

Figure 18:
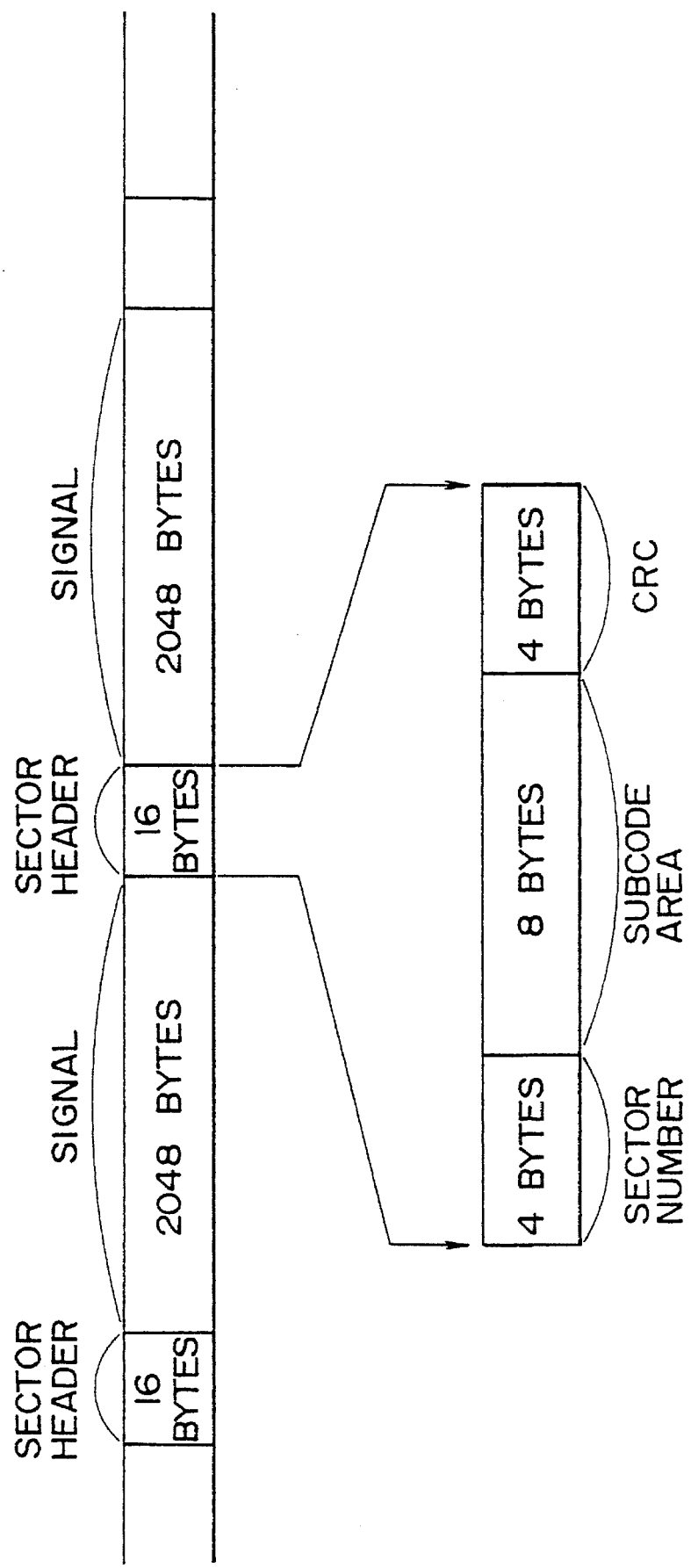
FIG. 18 shows the sector structure of the disk in the embodiments shown in FIGS. 16 and 17.

In the following description, it will be assumed that effective capacity of one sector is 2,048 bytes, and that the sector header, which includes the sector number of the sector, requires an additional 16 bytes, as shown in FIG. 18. The sector header addition circuit 51 divides the multiplexed signal it receives from the TOC addition circuit 51 into blocks of 2,048 bytes each, and adds a sector header of 16 bytes. The 8 bytes in the sector header that are not used in the conventional apparatus are used for the subcode in the apparatus according to the invention.

The positions of the sectors in which the three previous entry points and the three following entry points appear are read out from the entry point storage device 33A and are delivered to the subcode generation circuit 80. The subcode generation circuit 80 generates the subcode shown in FIG. 19 using the entry points received from the entry point storage device 33A, and information from the controller and the user (not shown). The subcode is fed to the CRC encoder 81, which calculates a CRC code, adds the CRC code to the end of the subcode, and feeds the result to the subcode synchronization pattern addition circuit 82. The subcode synchronization pattern addition circuit 82 adds a synchronization pattern to the beginning of the subcode received from the CRC encoder 81, and feeds the resulting subcode to the subcode buffer 83.

The multiplexed signal read out from the DSM 10 via the TOC addition circuit 50 passes into the sector header addition circuit 51, which divides the multiplexed signal into blocks of 2,048 bytes and adds a sector header of 16 bytes. The sector header addition circuit 51 also writes the sector number in the sector header. The output of the sector header addition circuit 51 is fed to the subcode addition circuit 84, which reads 8 bytes of the subcode out of the subcode buffer 83, and writes them into the sector header in the subcode location therein. Since the subcode includes a total of 32 bytes and the subcode location accommodates 8 bytes, each subcode is distributed among the sector headers of four sectors.

The output of the subcode addition circuit 84 is fed via the ECC encoder 52 and the modulation circuit 53 to the cutting machine 54, which records the resulting recording signal onto the optical disk master 60.

Figure 19:
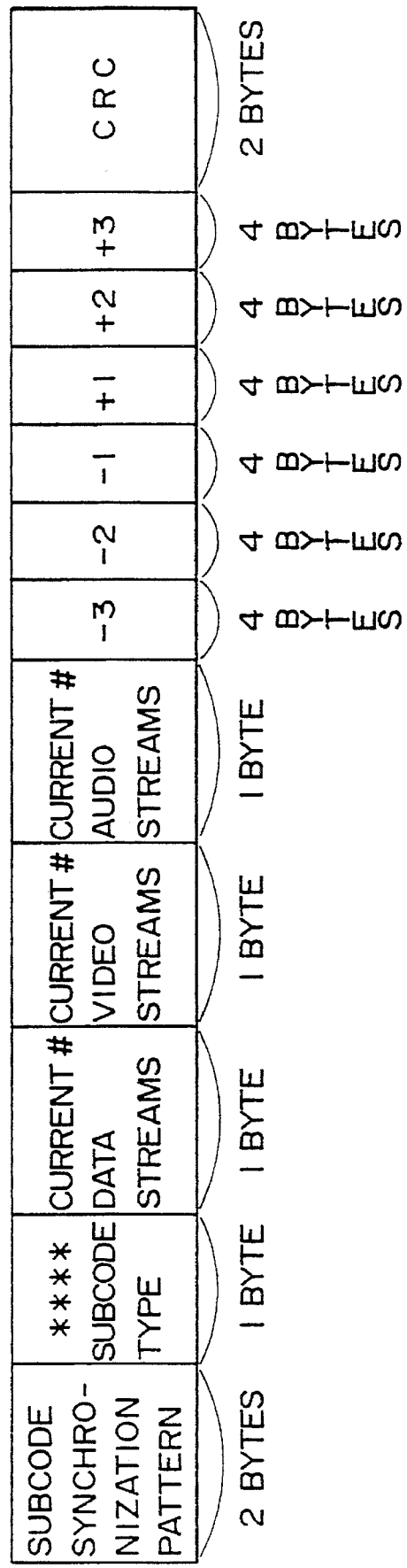
FIG. 19 shows the subcode data on the disk in the embodiments shown in FIGS. 16 and 17.

As shown in FIG. 19, the positions of the three previous entry points and the three following entry points are written in the locations entry_point_-3, entry_point_-2, entry_point_-1, entry point+1, entry point_+2 and entry_point_+3, respectively in the subcode.

Finally, the apparatus for reproducing a disk recorded by the embodiment shown in FIG. 16 will be described with reference to FIG. 17. The signal demodulated by the demodulation circuit 62 is fed to the ECC circuit 63, and also to the subcode detection circuit 90. The output of the subcode detection circuit 90 is fed to the subcode CRC circuit 91, which performs error detection. A subcode for which no error has been detected is fed to the subcode buffer 92 in preparation for reading by the controller 67.

The controller 67 includes an entry point storage device 93 which stores entry points received from the subcode buffer 92 in readiness for when a search instruction is received from the user (not shown). The construction of the rest of the circuit is similar to that of the conventional embodiment shown in FIG. 8.

Operation of the disk reproducing apparatus shown in FIG. 17 will now be described. When the optical disk 60A is inserted into the apparatus, the controller 67 delivers a read first sector command to the drive control circuit 69. The drive control circuit 69 drives the pickup 61 via the tracking servo circuit 70 to the position of the first sector on the optical disk 60A and starts reproducing from the beginning of the first sector.

The pickup 61 illuminates the surface of the optical disk 60A with a laser beam, and reproduces the signal recorded on the disk using reflected light from the disk. The signal from the pickup 61 is fed into the demodulation circuit 62, which demodulates it. The demodulated signal is fed to the ECC circuit 63, which performs error detection and correction. The resulting error-corrected signal is fed to the demultiplexer circuit 64.

The TOC, which is recorded in the first sector of the optical disk 60A, is separated by the demultiplexer circuit 64 and fed to the controller 67. The controller 67 causes the TOC storage device 68 to store the TOC and causes the TOC to be displayed to the user (not shown) on a display (not shown).

The controller 67, after receiving a reproduce command from the user (not shown) delivers a command to the drive control circuit 69 to start operation. The drive control circuit 69 drives the pickup 61 via the tracking servo circuit 70 to start reproducing from the position on the disk 60 indicated by the user. At the same time, the drive control circuit 69 delivers a command to the video decoder 65 and the audio decoder 66 to prepare to decode input signals.

After reading the TOC, the pickup 61 illuminates the surface of the optical disk 60A with a laser beam, and reproduces the signal recorded on the disk using reflected light from the disk. The signal from the pickup 61 is fed to the demodulation circuit 62, which performs demodulation. The demodulated signal is fed to the ECC circuit 63, which performs error detection and correction. The resulting error-corrected signal is fed to the demultiplexer circuit 64.

The video signal separated by the demultiplexer 64 is fed to the video decoder 65, and the audio signal is fed to the audio decoder 66. The video signal and the audio signal, which are compressed, are expanded by the video decoder 65 and the audio decoder 66, respectively, to provide a decompressed digital video signal and a decompressed digital audio signal, respectively.

The signal from the demodulation circuit 62 is also fed to the subcode detection circuit 90. The subcode detection circuit 90 extracts the portions of subcode from the sector headers. In this example, 8 bytes of subcode are extracted from each of four sector headers. The subcode synchronization pattern is detected in the subcode extracted from plural sector headers, and the subcode is fed into the subcode CRC circuit 91 starting with the beginning of the subcode. The CRC circuit 91 determines from the subcode it receives and CRC data therein whether there is an error in the subcode. When no error is found, the subcode is fed to the subcode buffer 92.

The controller 67 reads the entry points from the subcode buffer 92 and supplies them to the entry point storage device 93, which stores them. Since the drive control circuit supplies the current read position to the controller 92, the controller 67 can cause the positions of the entry points and contents of the entry points to be stored in a corresponding relationship to each other.

Operation of the multiplexed signal reproduction apparatus shown in FIG. 17 during a search now be described. When the user (not shown) enters a search command, the controller 67 instructs the video decoder 65 and the audio decoder 66 to enter into search mode. The controller 67 also reads the current read position from the output of the drive control circuit 69, and reads the relative positions of entry points near the current read position from the entry point storage device 93.

After the controller determines the position of the entry point from the entry points read from the entry point storage device, it sends a search instruction to the drive control circuit 69. The drive control circuit 69 drives the tracking servo circuit 70 to move the pickup 61 at high speed to the position of the entry point determined by the controller.

After the movement is completed, the pickup 61 starts reproducing from the entry point and feeds the reproduced signal to the demodulation circuit 62. The demodulated signal is supplied to the video decoder 65, via the ECC circuit 63 and the demultiplexer circuit 64, and the subcode portion is separated from the demodulated signal by the subcode detection circuit 90, the subcode CRC circuit 91, and the subcode buffer 92. The resulting subcode is fed to the controller 67 for use.

Since pickup 61 starts reproduction at an entry point, the first picture of the video signal supplied to the video decoder 65 is an I-picture. The video decoder 65 immediately decodes the I-picture, and feeds it to the video output. The audio decoder 66 is muted in search mode.

Since the positions of the previous three entry points and the following three entry points relative to the current position of the pickup are recorded in the subcode reproduced from the current read position, the controller 67 uses the reproduced position information to cause the pickup to jump to next entry point, and repeats the sequence of jumping to the next entry point and reproducing the I-picture from the disk starting at the next entry point. The results in a rapid succession of I-pictures being reproduced from the disk.

The controller 67 causes the pickup 61 to jump to a more distant entry point when the rate of search is high, and causes the pickup 61 to jump to a closer entry point when the rate of search is low. Since the relative positions of three entry points in each of the forward and reverse directions are stored, three or more variations in search rate can be obtained by selecting different combinations of entry points.

Although illustrative embodiments of the invention have been described herein in detail, it is to be understood that the invention is not limited to the precise embodiments described, and that various modifications may be practiced within the scope of the invention defined by the appended claims.

We claim:

1. An apparatus for generating from a variable-rate coded signal a multiplexed signal for recording on a recording medium, the multiplexed signal being adapted to enable intrinsically-decodable signal portions included at irregular intervals in the variable-rate coded signal to be successively reproduced for decoding when the recording medium is searched at high speed, the variable-rate coded signal being generated by compressing a digital input signal using a variable compression ratio, the apparatus comprising:

flag signal generating means for generating a flag signal indicating each of the intrinsically-decodable signal portions in the variable-rate coded signal;

determining means, operating in response to the flag signal, for determining location information for each one of the intrinsically-decodable signal portions, the location information for the one of the intrinsically-decodable signal portions indicating a location of an adjacent one of the intrinsically-decodable signal portions;

decodable signal pointer generating means for receiving the location information from the determining means, and for generating a decodable signal pointer for each one of the intrinsically-decodable signal portions, the decodable signal pointer including the location information determined by the determining means for the one of the intrinsically-decodable signal portions; and multiplexing means for multiplexing the decodable signal pointer generated by the decodable signal generating means for each one of the intrinsically-decodable signal portions with the variable-rate coded signal to produce the multiplexed signal, the multiplexing means operating to locate the decodable signal pointer adjacent to the one of the intrinsically-decodable signal portions in the multiplexed signal.

2. The apparatus of claim 1, wherein the multiplexing means operates to locate the decodable signal pointer for each one of the intrinsically-decodable signal portions immediately ahead of the one of the intrinsically-decodable signal portions in the multiplexed signal.

3. The apparatus of claim 2, wherein:

the digital input signal is a digital video signal including plural pictures, each of the pictures being compressed in one of an intra-picture mode and an inter-picture mode; and the flag signal generating means includes:
receiving means for receiving the variable-rate coded signal,
identifying means for analyzing the variable-rate coded signal received by the receiving means to identify therein signal portions respectively resulting from compressing pictures in the intra-picture mode as the intrinsically-decodable signal portions, and
means for generating the flag signal in response to each of the signal portions identified by the identifying means as the intrinsically-decodable signal portions.

4. The apparatus of claim 2, wherein:

the apparatus additionally comprises means for recording the multiplexed signal on a recording medium; and the determining means is for determining location information indicating a location on the recording medium of the decodable signal pointer of the adjacent one of the intrinsically-decodable signal portions in the multiplexed signal.

5. The apparatus of claim 2, wherein:

the apparatus additionally comprises means for recording the multiplexed signal on a recording medium; and the determining means is for determining location information indicating locations on the recording medium of the decodable signal pointers of ones of the intrinsically-decodable signal portions successively disposed about the one of the intrinsically-decodable signal portions in the multiplexed signal.

6. The apparatus of claim 1, wherein:

the apparatus additionally means for receiving an uncompressed digital video signal comprising plural pictures; and the flag signal generating means includes compressing means for compressing the uncompressed digital video signal using a variable compression ratio to provide the variable-rate coded signal, the compressing means compressing each of the pictures of the uncompressed digital video signal in one of an intra-picture compression mode and an inter-picture compression mode, each of the pictures compressed in the intra-picture compression mode providing one of the intrinsically-decodable signal portions of the variable-rate coded signal, the compressing means additionally generating the flag signal for each of the pictures compressed in the intra-picture compression mode.

7. The apparatus of claim 1, wherein the decodable signal pointer generating means is for:

generating an entry packet as the decodable signal pointer for each one of the intrinsically-decodable signal portion; and including the location information for the one of the intrinsically-decodable signal portions in the entry packet.

8. The apparatus of claim 7, wherein the multiplexing means is for multiplexing the entry packet for each one of the intrinsically-decodable signal portions with the variable-rate coded signal, and operates to locate the entry packet immediately ahead of the one of the intrinsically-decodable signal portions in the multiplexes signal.

9. The apparatus of claim 8, wherein:

the apparatus additionally comprises:
recording means for recording the multiplexed signal on the recording medium in a first recording operation, and
storage means for storing a location on the recording medium of the entry packet for each of the intrinsically-decodable signal portions; and the recording means is additionally for recording on the recording medium, in a second recording operation, ones of the locations read from the storage means into the entry packet for each of the intrinsically-decodable signal portions recorded on the recording medium in the first recording operation.

10. The apparatus of claim 9, wherein:

in the first recording operation, the recording means records into the entry packet for each one of the intrinsically-decodable signal portions the locations of a predetermined number of the entry packets preceding the entry packet for the one of the intrinsically-decodable signal portions in the multiplexed signal; and in the second recording operation, the recording means records into the entry packet for each one of the intrinsically-decodable signal portions the locations of a predetermined number of the entry packets following the entry packet for the one of the intrinsically-decodable signal portions in the multiplexed signal.

11. The apparatus of claim 8, wherein:

the decodable signal pointer generating means comprises:
accumulating means for accumulating a predetermined quantity of the variable-rate coded signal, and
means, responsive to the flag signal, for generating a control signal when the predetermined quantity of the variable-rate coded signal accumulated in the accumulating means includes one of the intrinsically-decodable signal portions; and the decodable signal pointer generating means generates each of the entry packets in response to the control signal.

12. The apparatus of claim 1, wherein the decodable signal pointer generating means is for generating subcode as the decodable signal pointer for each one of the intrinsically-decodable signal portions, the subcode representing the location information.

13. The apparatus of claim 12, wherein:

the multiplexing means includes means for dividing the variable-rate coded signal into sectors, each of the sectors having a beginning, and for adding a sector header to the beginning of each of the sectors; and the multiplexing means includes subcode inserting means for inserting the subcode for the one of the intrinsically-decodable signal portions into the sector header of one of the sectors accommodating the one of the intrinsically-decodable signal portions to multiplex the decodable signal pointer for the one of the intrinsically-decodable signal portions with the variable-rate coded signal.

14. The apparatus of claim 13, wherein:

the one of the intrinsically-decodable signal portions is accommodated in consecutive ones of the sectors; and the subcode inserting means is additionally for distributing the subcode for the one of the intrinsically-decodable signal portions among the sector headers of the consecutive ones of the sectors accommodating the one of the intrinsically-decodable signal portions.

15. The apparatus of claim 13, wherein:

the apparatus additionally comprises means for recording the multiplexed signal on the recording medium; and the determining means is for determining location information indicating a location on the recording medium of an adjacent one of the sectors having a sector header that includes subcode as a decodable signal pointer.

16. A method for generating from a variable-rate coded signal a multiplexed signal for recording on a recording medium, the multiplexed signal being adapted to enable intrinsically-decodable signal portions included at irregular intervals in the variable-rate coded signal to be reproduced and decoded when the recording medium is searched at high speed, the variable-rate coded signal being generated by compressing a digital input signal using a variable compression ratio, the method comprising steps of:

generating a flag signal indicating each of the intrinsically-decodable signal portions in the variable-rate coded signal;

determining, for each one of the intrinsically-decodable signal portions indicated by the flag signal in the variable-rate coded signal, location information indicating a location of an adjacent one of the intrinsically-decodable signal portions;

generating, in response to the location information determined in the determining step, a decodable signal pointer for each one of the intrinsically-decodable signal portions, the decodable signal pointer including the location information for the adjacent one of the intrinsically-decodable signal portions; and multiplexing the decodable signal pointer generated for each one of the intrinsically-decodable signal portions in the generating step with the variable-rate coded signal to produce the multiplexed signal, and to locate the decodable signal pointer adjacent to the one of the intrinsically-decodable signal portions in the multiplexed signal.

17. The method of claim 16, wherein, in the multiplexing step, the decodable signal pointer for each one of the intrinsically-decodable signal portions is multiplexed with the variable-rate coded signal to locate the decodable signal pointer for the one of the intrinsically-decodable signal portions immediately ahead of the one of the intrinsically-decodable signal portions in the multiplexed signal.

18. The method of claim 17, wherein:

the digital input signal is a digital video signal including plural pictures, each of the pictures being compressed in one of an intra-picture mode and an inter-picture mode; and the step of generating a flag signal includes steps of:
receiving the variable-rate coded signal,
identifying, in the variable-rate coded signal, signal portions respectively resulting from compressing pictures in the intra-picture mode as the intrinsically-decodable signal portions, and
generating the flag signal in response to the signal portions identified in the identifying step as the intrinsically-decodable signal portions.

19. The method of claim 17, wherein:

the method additionally comprises a step of recording the multiplexed signal on the recording medium; and the determining step determines location information indicating a location on the recording medium of the decodable signal pointer of the adjacent one of the intrinsically-decodable signal portions signal-type marker, the additional signal-type marker being proximate to the in the multiplexed signal.

20. The method of claim 17, wherein:

the method additionally comprises a step of recording the multiplexed signal on the recording medium; and the determining step determines location information indicating locations on the recording medium of the decodable signal pointers of ones of the intrinsically-decodable signal portions successively disposed about the one of the intrinsically-decodable signal portions in the multiplexed signal.

21. The method of claim 16, wherein:

the method additionally comprises a step of receiving an uncompressed digital video signal comprising plural pictures;

the flag generating step includes steps of:
compressing the uncompressed digital video signal using a variable compression ratio to provide the variable-rate coded signal, each of the pictures of the uncompressed digital video signal being compressed in one of an intra-picture compression mode and an inter-picture compression mode, each of the pictures compressed in the intra-picture compression mode providing one of the intrinsically-decodable signal portions of the variable-rate coded signal, and
generating the flag signal for each of the pictures compressed in the intra-picture compression mode.

22. The method of claim 16, wherein the step of generating the decodable signal pointer includes steps of:

generating an entry packet as the decodable signal pointer for each one of the intrinsically-decodable signal portions; and including the location information for the one of the intrinsically-decodable signal portions in the entry packet.

23. The method of claim 22, wherein the multiplexing step multiplexes the entry packet for each one of the intrinsically-decodable signal portions with the variable-rate coded signal to locate the entry packet immediately ahead of the one of the signal portions in the multiplexed signal.

24. The method of claim 23, wherein:

the method additionally comprises steps of:
recording the multiplexed signal on the recording medium in a first recording operation,
storing a location on the recording medium of the entry packet for each of the intrinsically-decodable signal portions, and
recording on the recording medium, in a second recording operation, ones of the locations stored in the storing step into the entry packet for each of the intrinsically-decodable signal portions recorded on the recording medium in the first recording operation.

25. The method of claim 24, wherein:

in the first recording operation, the recording step records into the entry packet for each one of the intrinsically-decodable signal portions the locations of a predetermined number of entry packets preceding the entry packet of the one of the intrinsically-decodable signal portions in the multiplexed signal; and in the second recording operation, the recording step records into the entry packet for each one of the intrinsically-decodable signal portions the locations of a predetermined number of entry packets following the entry packet for the one of the intrinsically-decodable signal portions in the multiplexed signal.

26. The method of claim 23, wherein:

the step of generating a decodable signal pointer comprises steps of:
accumulating a predetermined quantity of the variable-rate coded signal, and
generating, in response to the flag signal, a control signal when the predetermined quantity of the variable-rate coded signal accumulated in the accumulating means includes one of the intrinsically-decodable signal portions; and in the step of generating a decodable signal pointer, the entry packet is generated in response to the control signal.

27. The method of claim 16, wherein the step of generating the decodable signal pointer includes a step of generating subcode the decodable signal pointer for each of the intrinsically-decodable signal portions, the subcode representing the location information of the one of the intrinsically-decodable signal portions.

28. The method of claim 27, wherein the multiplexing step includes steps of:

dividing the variable-rate coded signal into sectors, each of the sectors beginning with a sector header; and inserting the subcode into the sector header of one of the sectors accommodating at least part of the one of the intrinsically-decodable signal portions to multiplex the decodable signal pointer for the one of the intrinsically-decodable signal portions with the variable-rate coded signal.

29. The method of claim 28, wherein, in the multiplexing step:

the one of the intrinsically-decodable signal portions is accommodated in consecutive ones of the sectors; and in the inserting step, the subcode is distributed among the sector headers of ones of the consecutive ones of the sectors accommodating the one of the intrinsically-decodable signal portions.

30. The method of claim 28, wherein:

the method additionally comprises a step of recording the multiplexed signal on the recording medium; and the determining step determines location information indicating a location on the recording medium of an adjacent one of the sectors having a sector header that includes subcode as a decodable signal pointer.

31. Apparatus for reproducing a multiplexed signal recorded on a recording medium to effect a high-speed search, the multiplexed signal including intrinsically-decodable signal portions of a variable-rate coded signal at irregular intervals, and a decodable signal pointer adjacent each of the intrinsically-decodable signal portions, the apparatus effecting the high-speed search by successively reproducing and decoding the intrinsically-decodable signal portions in the multiplexed signal in response to the decodable signal pointers, the apparatus comprising:

reproducing means for reproducing part of the multiplexed signal from a read position on the recording medium, the part of the multiplexed signal including one of the intrinsically-decodable signal portions of the variable-rate coded signal and the decodable signal pointer adjacent thereto;

demultiplexing means for receiving the part of the multiplexed signal from the reproducing means, and for demultiplexing the part of the multiplexed signal to provide the one of the intrinsically-decodable signal portions of the variable-rate coded signal and the decodable signal pointer;

extracting means for receiving the decodable signal pointer from the demultiplexing means, and for extracting location information from the decodable signal pointer, the location information indicating a location of an adjacent one of the intrinsically-decodable signal portions; and control means for causing the reproducing means to change the read position to the location of the adjacent one of the intrinsically-decodable signal portions in response to the location information extracted by the extracting means from the decodable signal pointer and indicating the location of the adjacent one of the intrinsically-decodable signal portions.

32. The reproducing apparatus of claim 31, wherein:

the apparatus additionally comprises search rate selecting means for selecting a search rate at which the recording medium is searched;

the extracting means is for extracting location information indicating locations on the recording medium of the decodable signal pointers of a number of the intrinsically-decodable signal portions successively preceding and following the one of the intrinsically-decodable signal portions;

the extracting means includes location selecting means, operating in response to the search rate selected by the search rate selecting means, for selecting from the location information extracted from the decodable signal pointer the location of the decodable signal pointer of one of the number of intrinsically-decodable signal portions as a selected location; and the control means causes the reproducing means to change the read position in response to the selected location selected by the location selecting means.

33. The reproducing apparatus of claim 31, wherein the apparatus additionally comprises:

storage means for storing the location information extracted by the extracting means from the decodable signal pointer; and means, operating in response to a search command, for reading the location information from the storage means, and for feeding the location information to the control means.

34. The reproducing apparatus of claim 31, wherein:

the apparatus additionally includes decoding means for decoding the intrinsically-decodable signal portions of the variable-rate coded signal demultiplexed by the demultiplexed means from the multiplexed signal reproduced by the reproducing means, the decoding means generating a picture of an output signal from each one of the intrinsically-decodable signal portions.

35. The reproducing apparatus of claim 34, wherein the decoding means generates the picture of the output signal from the one of the intrinsically-decodable signal portions demultiplexed by the demultiplexing means from the part of the multiplexed signal reproduced by the reproducing means at each read position on the recording medium.

36. The reproducing apparatus of claim 31, wherein:

the variable-rate coded signal includes signal portions, the signal portions including the intrinsically-decodable signal portions, each of the signal portions being derived by compressing a picture of a video signal in one of an intra-picture mode and an inter-picture mode; and the demultiplexing means functions to demultiplex the decodable signal pointer from a point immediately preceding each of the intrinsically-decodable signal portions in the multiplexed signal, each of the intrinsically-decodable signal portions being derived from a picture compressed in the intra-picture mode.

37. The reproducing apparatus of claim 31, wherein the demultiplexing means functions to demultiplex the part of the multiplexed signal received from the reproducing means to provide an entry packet for the one of the intrinsically-decodable signal portions, the entry packet including the decodable signal pointer for the one of the intrinsically-decodable signal portions.

38. The reproducing apparatus of claim 37, wherein, the demultiplexing means functions to demultiplex the entry packet for the one of the intrinsically-decodable signal portions from a point immediately preceding the one of the intrinsically-decodable signal portions in the multiplexed signal.

39. The reproducing apparatus of claim 37, wherein:

the variable-rate coded signal includes signal portions, the signal portions including the intrinsically-decodable signal portions, each of the signal portions being derived by compressing a picture of a video signal in one of an intra-picture mode and an inter-picture mode; and the demultiplexing means functions to demultiplex the entry packet for the one of the intrinsically-decodable signal potions from a point immediately preceding the one of the intrinsically-decodable signal portions in the multiplexed signal, the one of the intrinsically-decodable signal portions being derived from a picture compressed in the intra-picture mode.

40. The reproducing apparatus of claim 31, wherein:

the multiplexed signal is divided into sectors, each of the sectors beginning with a sector header; and the decodable signal pointer is represented by subcode included in the sector header of one of the sectors accommodating one of the intrinsically decodable signal portions.

41. The reproducing apparatus of claim 40, wherein the demultiplexing means functions to demultiplex the subcode representing the decodable signal pointer from the sector header of one of the sectors accommodating the one of the intrinsically-decodable portions.

42. The reproducing apparatus of claim 41, wherein the demultiplexing means additionally functions to demultiplex the subcode from the sector headers of consecutive ones of the sectors accommodating the one of the intrinsically-decodable signal portions.

43. The reproducing apparatus of claim 40, wherein:

the variable-rate coded signal includes signal portions, the signal portions including the intrinsically-decodable signal portions, each of the signal portions being derived by compressing a picture of a video signal in one of an intra-picture mode and an inter-picture mode; and the demultiplexing means functions to demultiplex the subcode from sector headers of consecutive ones of the sectors accommodating the one of the intrinsically-decodable signal portions, the one of the intrinsically-decodable signal portions being derived by compressing a picture in the intra-picture mode.

44. Method of reproducing a multiplexed signal recorded on a recording medium to effect a high-speed search, the multiplexed signal including decodable portions of a variable-rate coded signal at irregular intervals, and a decodable signal pointer adjacent each of the intrinsically-decodable signal portions, the apparatus effecting a high-speed search by successively reproducing and decoding the intrinsically-decodable signal portions in the multiplexed signal in response to position information in the decodable signal pointers, the method comprising repeating a sequence of steps including steps of:

reproducing part of the multiplexed signal from a read position on the recording medium, the part of the multiplexed signal including one of the intrinsically-decodable signal portions and the decodable signal pointer adjacent thereto;

demultiplexing the part of multiplexed signal reproduced in the reproducing step to provide the one of the intrinsically-decodable signal portions of the variable-rate coded signal and the decodable signal pointer adjacent thereto;

extracting the location information from the decodable signal pointer demultiplexed by the demultiplexing step, the location information indicating a location of an adjacent one of the intrinsically-decodable signal portions; and changing the read position to the location of the adjacent one of the intrinsically-decodable signal portions on the recording medium in response to the location information extracted in the extracting step from the decodable signal pointer, the location information indicating the location of the adjacent one of the intrinsically-decodable signal portions.

45. The reproducing method of claim 44, wherein:

the method additionally comprises a step of selecting a search rate at which the recording medium is searched;

the extracting step extracts location information indicating locations on the recording medium of the decodable signal pointers of a number of the intrinsically-decodable signal portions successively preceding and following the one of the intrinsically-decodable signal portions;

the extracting step additionally includes a step of selecting from the location information extracted in the extracting step the location of the decodable signal pointer of one of the number of intrinsically-decodable signal portions, the location of the intrinsically-decodable signal pointer being selected in response to the search rate selected in the search rate selecting step; and in the step of changing the read position, the read position is changed to the read position indicated by the location selected in the location selecting step.

46. The reproducing method of claim 44, wherein:

the method additionally comprises steps of:

providing a storage device, storing the location information extracted in the extracting step from the decodable signal pointer in the storage device, and in response to a search command, reading from the search device the stored location information; and in the step of changing the read position, the read position is changed in response to the location information read from the storage device.

47. The reproducing method of claim 44, wherein the sequence of steps additionally includes a step of decoding the intrinsically-decodable signal portions of the variable-rate coded signal demultiplexed in the demultiplexing step from the part of the multiplexed signal reproduced in the reproducing step, the decoding step generating a picture of an output signal from each of the intrinsically-decodable signal portions.

48. The reproducing method of claim 47, wherein when the sequence of steps is repeated, after the demultiplexing step, the step of decoding the intrinsically-decodable signal portion decodes the intrinsically-decodable signal portion demultiplexed from the part of the multiplexed signal reproduced from the read position in the reproducing step to generate one picture of the output signal.

49. The reproducing method of claim 47, wherein the variable-rate coded signal includes signal portions, including the intrinsically-decodable signal portions, each of the signal portions being derived by compressing a picture of a video signal in one of an intra-picture mode and an inter-picture mode, the intrinsically-decodable signal portions being derived by compressing a picture in the intra-picture mode, and wherein:

the demultiplexing step operates to demultiplex the decodable signal pointer from a point immediately preceding the intrinsically-decodable signal portion in the part of the multiplexed signal reproduced in the reproducing step.

50. The reproducing method of claim 44, wherein, in the multiplexed signal, the decodable signal pointer is included in an entry packet.

51. The reproducing method of claim 50, wherein, in the demultiplexing step, the entry packet for each one of the intrinsically-decodable signal portions is demultiplexed from a point immediately preceding the one of the signal portions in the multiplexed signal.

52. The reproducing method of claim 50, wherein:

in the multiplexed signal, the variable-rate coded signal includes signal portions, the signal portions including the intrinsically-decodable signal portions, each of the signal portions being derived by compressing a picture of a video signal, each picture being compressed in one of an intra-picture mode and an inter-picture mode; and the demultiplexing step demultiplexes the entry packet for each one of the intrinsically-decodable signal portions from a point immediately preceding the one of the intrinsically-decodable signal portions in the multiplexed signal, the one of the intrinsically-decodable signal portions being derived from a picture compressed in the intra-picture mode.

53. The reproducing method of claim 44, wherein:

the multiplexed signal is divided into sectors, each of the sectors beginning with a sector header; and the decodable signal pointer of each one of the intrinsically-decodable signal portions is represented by subcode included in the sector header of at least one of the sectors accommodating the one of the intrinsically-decodable signal portions.

54. The reproducing method of claim 53, wherein the demultiplexing step demultiplexes the subcode representing the decodable signal pointer of each one of the intrinsically-decodable signal portions from the sector header of one of the sectors accommodating the one of the intrinsically-decodable signal portions.

55. The reproducing method of claim 53, wherein the demultiplexing step demultiplexes the subcode representing the decodable signal pointer of each one of the intrinsically-decodable signal portions from the sector headers of consecutive ones of the sectors accommodating the one of the intrinsically-decodable signal portions.

56. The reproducing method of claim 53, wherein:

in the multiplexed signal, the variable-rate coded signal includes signal portions, the signal portions including the intrinsically-decodable signal portions, each of the signal portions being derived by compressing a picture of a video signal, in one of an intra-picture mode and an inter-picture mode; and the demultiplexing step demultiplexes the subcode representing the decodable signal pointer of each one of the intrinsically-decodable signal portions from the sector headers of consecutive ones of the sectors accommodating the one of the intrinsically-decodable signal portions, the one of the intrinsically-decodable signal portions being derived by compressing a picture in the intra-picture mode.

57. A method of recording an information signal in a recording medium to enable portions of the information signal to be reproduced from the recording medium during a search thereof, the method comprising steps of:

providing a recording medium; and recording a multiplexed signal in the recording medium, the multiplexed signal being generated by steps including:

providing a variable-rate coded signal comprising plural signal portions, the signal portions including intrinsically-decodable signal portions at irregular intervals, determining, for each one of the intrinsically-decodable signal portions of the variable-rate coded signal, location information indicating a location on the recording medium of an adjacent one of the intrinsically-decodable signal portions, and multiplexing the variable-rate coded signal and decodable signal pointers to locate one of the decodable signal pointers adjacent each one of the intrinsically-decodable signal portions, the one of the decodable signal pointers including the location information for the one of the intrinsically-decodable signal portions.

58. The recording method of claim 57, wherein, in the step of recording the multiplexed signal, the decodable signal pointer is recorded in the recording medium immediately preceding the one of the intrinsically-decodable signal portions.

59. The recording method of claim 57, wherein the determining step determines location information indicating locations on the recording medium of the decodable signal pointers of plural ones of the intrinsically-decodable signal portions successively disposed about the one of the intrinsically-decodable signal portions.

60. The recording method of claim 57, wherein:

in the step of providing a variable-rated coded signal, each of the intrinsically-decodable signal portions has a beginning;

the determining step includes a step of generating an entry packet for each one of the decodable signal portions as the decodable signal pointer, the entry packet including the location information; and in the multiplexing step:

the variable-rate coded signal is divided into packs comprising packets for recording on the recording medium, and the entry packet for the one of the intrinsically-decodable signal portion is multiplexed to locate the entry packet immediately preceding the one of the packets including the beginning of the one of the intrinsically-decodable signal portions.

61. The recording method of claim 60, wherein the step of providing the variable-rate coded signal includes steps of:

providing a video input signal including pictures; and compressing each of the pictures of the video input signal in one of an intra-picture mode and an inter-picture mode to generate a respective one of the signal portions of the variable-rate coded signal, each of the intrinsically-decodable signal portions being one of the signal portions resulting from compressing one of the pictures in the intra-picture mode.

62. The recording method of claim 57, wherein:

in the step of providing a variable-rate coded signal, each of the intrinsically-decodable signal portions has a beginning;

in the determining step, subcode is generated for each of the intrinsically-decodable signal portions as the decodable signal pointer; and in the multiplexing step:

the multiplexed signal is divided into sectors for recording on the recording medium, each of the sectors beginning with a sector header, the sector header accommodating subcode, and the subcode for the one of the intrinsically-decodable signal portions is included in the sector header of at least the one of the sectors accommodating the beginning of the one of the intrinsically-decodable signal portions.

63. The recording method of claim 62, wherein the step of providing the variable-rate coded signal includes step of:

providing a video input signal including pictures; and compressing each of the pictures of the video input signal in one of an intra-picture mode and an inter-picture mode to generate a respective one of the signal portions of the variable-rate coded signal, each of the intrinsically-decodable signal portions being one of the signal portions resulting from compressing one of the pictures in the intra-picture mode.

* * * * *

UNITED STATES PATENT AND TRADEMARK OFFICE
CERTIFICATE OF CORRECTION

PATENT NO. : 5,455,684
DATED : October 3, 1995
INVENTOR(S) : Yasushi Fujinami, et al.

It is certified that error appears in the above-indentified patent and that said Letters Patent is hereby corrected as shown below:

In Claim 7, column 21, line 15, "tion;" should be --tions;--;

In Claim 8, column 21, line 23, "multiplexes" should be --multiplexed--;

In Claim 19, column 23, lines 21-23, delete "signal-type marker, the additional signal-type marker being proximate to the".

Signed and Sealed this

Twenty-seventh Day of February, 1996

Attest:

BRUCE LEHMAN

*Attesting Officer*     *Commissioner of Patents and Trademarks*